(12) United States Patent
Binder

(10) Patent No.: US 7,221,679 B2
(45) Date of Patent: *May 22, 2007

(54) LOCAL AREA NETWORK OF SERIAL INTELLIGENT CELLS

(75) Inventor: Yehuda Binder, Hod Ha'sharon (IL)

(73) Assignee: Serconet Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/234,302

(22) Filed: Sep. 26, 2005

(65) Prior Publication Data

US 2006/0018338 A1 Jan. 26, 2006

Related U.S. Application Data

(63) Continuation of application No. 10/178,223, filed on Jun. 25, 2002, now Pat. No. 7,016,368, which is a continuation of application No. 09/123,486, filed on Jul. 28, 1998, now Pat. No. 6,480,510.

(51) Int. Cl.
*H04J 4/00* (2006.01)

(52) U.S. Cl. ............... 370/436; 370/502; 370/535; 370/908

(58) Field of Classification Search ............. 370/436, 370/502, 295, 335, 337, 342, 343, 347, 441, 370/254, 908, 535
See application file for complete search history.

(56) References Cited

U.S. PATENT DOCUMENTS

| | | | |
|---|---|---|---|
| 3,739,226 A | 6/1973 | Seiter | |
| 3,805,265 A | 4/1974 | Lester | |
| 3,806,814 A | 4/1974 | Forbes | |
| 3,836,888 A | 9/1974 | Boenke et al. | |
| 3,872,319 A | 3/1975 | Platzer | |
| 3,924,077 A | 12/1975 | Blakeslee | |
| 3,975,594 A | 8/1976 | Guntersdorfer | |
| 4,173,714 A | 11/1979 | Bloch et al. | |
| 4,339,816 A | 7/1982 | Reed | |
| 4,413,229 A | 11/1983 | Grant | |
| 4,484,185 A | 11/1984 | Graves | |
| 4,507,721 A | 4/1985 | Yamano et al. | |
| 4,509,211 A | 4/1985 | Robbins | |
| 4,510,493 A | 4/1985 | Bux et al. | |
| 4,636,914 A | 1/1987 | Belli | |

(Continued)

FOREIGN PATENT DOCUMENTS

DE  33 29 336 A1  12/1983

(Continued)

*Primary Examiner*—Chi Pham
*Assistant Examiner*—Alexander O. Boakye
(74) *Attorney, Agent, or Firm*—Browdy and Neimark, PLLC

(57) ABSTRACT

An outlet for coupling a data unit and an analog telephone set to in-wall wiring that simultaneously carries a bi-directional serial digital data signal multiplexed with a telephone signal. The outlet includes: a wiring connector operative for connecting the outlet to the in-wall wiring; a data interface connector coupled to the wiring connector and connectable to the data unit, for coupling the serial digital data signal to the data unit; a telephone connector coupled to the wiring connector and connectable to the analog telephone set, for coupling the telephone signal to the telephone set; and a single enclosure housing the wiring connector, the data interface connector and the telephone connector, wherein the enclosure is dimensioned to be mountable into a standard outlet receptacle or opening.

195 Claims, 9 Drawing Sheets

U.S. PATENT DOCUMENTS

| | | |
|---|---|---|
| 4,639,714 A | 1/1987 | Crowe |
| 4,647,725 A | 3/1987 | Dellinger et al. |
| 4,651,022 A | 3/1987 | Cowley |
| 4,672,605 A | 6/1987 | Hustig et al. |
| 4,714,912 A | 12/1987 | Roberts et al. |
| 4,745,391 A | 5/1988 | Gajjar |
| 4,750,094 A | 6/1988 | Krasik |
| 4,755,792 A | 7/1988 | Pezzolo et al. |
| 4,766,402 A | 8/1988 | Crane |
| 4,772,870 A | 9/1988 | Reyes |
| 4,782,322 A | 11/1988 | Lechner et al. |
| 4,785,448 A | 11/1988 | Reichert et al. |
| 4,787,082 A | 11/1988 | Delaney et al. |
| 4,807,225 A | 2/1989 | Fitch |
| 4,814,941 A | 3/1989 | Speet et al. |
| 4,825,349 A | 4/1989 | Marcel |
| 4,835,343 A | 5/1989 | Graef et al. |
| 4,896,349 A | 1/1990 | Kubo et al. |
| 4,918,690 A | 4/1990 | Markkula, Jr. et al. |
| 4,924,349 A | 5/1990 | Buehler et al. |
| 4,924,492 A | 5/1990 | Gitlin et al. |
| 4,937,611 A | 6/1990 | Harris |
| 5,010,399 A | 4/1991 | Goodman et al. |
| 5,025,443 A | 6/1991 | Gupta |
| 5,065,133 A | 11/1991 | Howard |
| 5,068,890 A | 11/1991 | Nilssen |
| 5,114,365 A | 5/1992 | Thompson |
| 5,144,544 A | 9/1992 | Jenneve et al. |
| 5,148,144 A | 9/1992 | Sutterlin et al. |
| 5,150,365 A | 9/1992 | Hirata et al. |
| 5,189,259 A | 2/1993 | Carson et al. |
| 5,192,231 A | 3/1993 | Dolin |
| 5,247,347 A | 9/1993 | Litteral et al. |
| 5,255,267 A | 10/1993 | Hansen et al. |
| 5,311,114 A | 5/1994 | Sambamurthy et al. |
| 5,311,593 A | 5/1994 | Carmi |
| 5,343,240 A | 8/1994 | Yu |
| 5,351,272 A | 9/1994 | Abraham |
| 5,356,311 A | 10/1994 | Liu |
| 5,402,902 A | 4/1995 | Bouley |
| 5,404,127 A | 4/1995 | Lee et al. |
| 5,406,260 A | 4/1995 | Cummings et al. |
| 5,414,708 A | 5/1995 | Webber |
| 5,421,030 A | 5/1995 | Baran |
| 5,440,335 A | 8/1995 | Beveridge |
| 5,473,517 A | 12/1995 | Blackmon |
| 5,491,463 A | 2/1996 | Sargeant et al. |
| 5,500,794 A | 3/1996 | Fujita |
| 5,504,454 A | 4/1996 | Daggett et al. |
| 5,535,336 A | 7/1996 | Smith et al. |
| 5,539,821 A | 7/1996 | Blonder |
| 5,563,782 A | 10/1996 | Chen et al. |
| 5,569,209 A | 10/1996 | Reitman |
| 5,574,256 A | 11/1996 | Cottone |
| 5,579,221 A | 11/1996 | Mun |
| 5,581,801 A | 12/1996 | Spriester et al. |
| 5,599,190 A | 2/1997 | Willette |
| 5,610,922 A | 3/1997 | Balatoni |
| 5,625,863 A | 4/1997 | Abraham |
| 5,671,220 A | 9/1997 | Tonomura |
| 5,684,826 A | 11/1997 | Ratner |
| 5,696,790 A | 12/1997 | Graham |
| 5,708,705 A | 1/1998 | Yamashita |
| 5,712,614 A | 1/1998 | Patel et al. |
| 5,736,965 A | 4/1998 | Mosebrook et al. |
| 5,796,739 A | 8/1998 | Kim |
| 5,801,635 A | 9/1998 | Price |
| 5,802,173 A | 9/1998 | Hamilton-Percy et al. |
| 5,805,806 A | 9/1998 | McArthur |
| 5,822,677 A | 10/1998 | Peyrovian |
| 5,822,678 A | 10/1998 | Evanyk |
| 5,833,350 A | 11/1998 | Moreland |
| 5,841,360 A | 11/1998 | Binder |
| 5,841,841 A | 11/1998 | Dodds et al. |
| 5,844,596 A | 12/1998 | Goodman |
| 5,845,190 A | 12/1998 | Bushue et al. |
| 5,848,054 A | 12/1998 | Mosebrook et al. |
| 5,878,047 A | 3/1999 | Ganek et al. |
| 5,884,086 A | 3/1999 | Amoni et al. |
| 5,888,732 A | 3/1999 | Humpleman |
| 5,895,888 A | 4/1999 | Arenas et al. |
| 5,895,985 A | 4/1999 | Fischer |
| 5,896,443 A | 4/1999 | Dichter |
| 5,896,556 A | 4/1999 | Moreland et al. |
| 5,900,584 A | 5/1999 | Cady et al. |
| 5,917,624 A | 6/1999 | Wagner |
| 5,919,060 A | 7/1999 | Lee |
| 5,929,896 A | 7/1999 | Goodman |
| 5,930,340 A | 7/1999 | Bell |
| 5,949,473 A | 9/1999 | Goodman |
| 5,960,066 A | 9/1999 | Hartmann et al. |
| 5,961,345 A | 10/1999 | Finn et al. |
| 5,963,539 A | 10/1999 | Harold, Jr. |
| 5,963,595 A | 10/1999 | Graham |
| 5,963,844 A | 10/1999 | Dail |
| 5,968,118 A | 10/1999 | Sutton |
| 5,994,998 A | 11/1999 | Fisher et al. |
| 6,009,465 A | 12/1999 | Decker et al. |
| 6,010,228 A | 1/2000 | Blackman |
| 6,011,794 A | 1/2000 | Mordowitz et al. |
| 6,026,078 A | 2/2000 | Smith |
| 6,038,425 A | 3/2000 | Jeffrey |
| 6,061,261 A | 5/2000 | Chen et al. |
| 6,069,588 A | 5/2000 | O'Neill |
| 6,069,899 A | 5/2000 | Foley |
| 6,081,519 A | 6/2000 | Petler |
| 6,081,533 A | 6/2000 | Laubach et al. |
| 6,087,860 A | 7/2000 | Liu |
| 6,109,959 A | 8/2000 | Burlinson et al. |
| 6,115,468 A | 9/2000 | DeNicolo |
| 6,115,755 A | 9/2000 | Baldev |
| 6,123,577 A | 9/2000 | Contois et al. |
| 6,137,865 A | 10/2000 | Ripy |
| 6,144,292 A | 11/2000 | Brown |
| 6,157,645 A | 12/2000 | Shobatake |
| 6,167,120 A | 12/2000 | Kikinis |
| 6,181,783 B1 | 1/2001 | Goodman |
| 6,185,284 B1 | 2/2001 | Goodman |
| 6,188,557 B1 | 2/2001 | Chaundrhy |
| 6,192,399 B1 | 2/2001 | Goodman |
| 6,207,895 B1 | 3/2001 | Engel |
| 6,215,789 B1 | 4/2001 | Keenan |
| 6,216,160 B1 | 4/2001 | Dichter |
| 6,218,930 B1 | 4/2001 | Katzenberg et al. |
| 6,219,409 B1 | 4/2001 | Smith et al. |
| 6,222,124 B1 | 4/2001 | Pritchard |
| 6,222,853 B1 | 4/2001 | Mesttinen |
| 6,236,718 B1 | 5/2001 | Goodman |
| 6,240,166 B1 | 5/2001 | Collin |
| 6,243,413 B1 | 6/2001 | Beukema |
| 6,243,446 B1 | 6/2001 | Goodman |
| 6,243,571 B1 | 6/2001 | Bullock |
| 6,252,754 B1 | 6/2001 | Chaundrhy |
| 6,282,075 B1 | 8/2001 | Chaundrhy |
| 6,292,517 B1 | 9/2001 | Jeffress et al. |
| 6,297,450 B1 | 10/2001 | Yu |
| 6,320,900 B1 | 11/2001 | Liu |
| 6,349,133 B1 | 2/2002 | Matthews et al. |
| 6,362,987 B1 | 3/2002 | Yurek et al. |
| 6,364,535 B1 | 4/2002 | Coffey |
| 6,373,944 B1 | 4/2002 | Beavers |
| 6,380,852 B1 | 4/2002 | Hartman et al. |
| 6,393,050 B1 | 5/2002 | Liu |
| 6,414,952 B2 | 7/2002 | Foley |

| | | |
|---|---|---|
| 6,420,964 B1 | 7/2002 | Nishikaws |
| 6,430,199 B1 | 8/2002 | Kerpez |
| 6,433,672 B1 | 8/2002 | Shirmard |
| 6,441,723 B1 | 8/2002 | Mansfield, Jr. et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,470,053 B1 | 10/2002 | Liu |
| 6,473,608 B1 | 10/2002 | Lehr et al. |
| 6,474,829 B2 | 11/2002 | Clodfelter |
| 6,475,022 B2 | 11/2002 | Tomino |
| 6,480,510 B1 | 11/2002 | Binder |
| 6,481,013 B1 | 11/2002 | Dinwiddie et al. |
| 6,483,902 B1 | 11/2002 | Stewart |
| 6,492,897 B1 | 12/2002 | Mowerly |
| 6,507,322 B2 | 1/2003 | Fang |
| 6,518,724 B2 | 2/2003 | Janik |
| 6,522,662 B1 | 2/2003 | Liu |
| 6,535,587 B1 | 3/2003 | Kobayashi |
| 6,539,011 B1 | 3/2003 | Keenan |
| 6,541,878 B1 | 4/2003 | Diab |
| 6,542,585 B2 | 4/2003 | Goodman |
| 6,543,940 B2 | 4/2003 | Chu |
| 6,556,581 B1 | 4/2003 | He |
| 6,563,816 B1 | 5/2003 | Nodoushani |
| 6,567,981 B1 | 5/2003 | Jeffrey |
| 6,570,890 B1 | 5/2003 | Keenan |
| 6,574,242 B1 | 6/2003 | Keenan |
| 6,577,631 B1 | 6/2003 | Keenan |
| 6,580,710 B1 | 6/2003 | Bowen et al. |
| 6,587,454 B1 | 7/2003 | Lamb |
| 6,601,097 B1 | 7/2003 | Cheston et al. |
| 6,609,927 B2 | 8/2003 | Kidman |
| 6,616,005 B1 | 9/2003 | Pereira et al. |
| 6,640,308 B1 | 10/2003 | Keyghobad et al. |
| 6,650,662 B1 | 11/2003 | Arnaud et al. |
| 6,653,932 B1 | 11/2003 | Beamish et al. |
| 6,658,098 B2 | 12/2003 | Lamb et al. |
| 6,678,321 B1 | 1/2004 | Graham et al. |
| 6,704,824 B1 | 3/2004 | Goodman |
| 6,710,553 B2 | 3/2004 | Lagan |
| 6,721,790 B1 | 4/2004 | Chen |
| 6,732,315 B2 | 5/2004 | Yagel et al. |
| 6,735,217 B1 | 5/2004 | Weber, Jr. et al. |
| 6,747,859 B2 | 6/2004 | Walbeck et al. |
| 6,750,398 B1 | 6/2004 | Richardson |
| 6,763,097 B1 | 7/2004 | Vitenberg |
| 6,765,149 B1 | 7/2004 | Ku |
| 6,771,774 B1 | 8/2004 | Phan et al. |
| 6,778,549 B1 | 8/2004 | Keller |
| 6,778,646 B1 | 8/2004 | Sun |
| 6,779,423 B2 | 8/2004 | Hammons et al. |
| 6,806,425 B1 | 10/2004 | O'Neill |
| 6,819,760 B1 | 11/2004 | Nayler |
| 6,838,997 B1 | 1/2005 | Davidson |
| 6,854,895 B2 | 2/2005 | Coffey et al. |
| 6,856,799 B1 | 2/2005 | Ritter |
| 6,864,798 B2 | 3/2005 | Janik |
| 6,868,072 B1 | 3/2005 | Lin et al. |
| 6,868,265 B2 | 3/2005 | Zodnik |
| 6,880,020 B1 | 4/2005 | Rubinstein et al. |
| 6,901,439 B1 | 5/2005 | Bonasia et al. |
| 6,907,458 B2 | 6/2005 | Tamassetti |
| 6,932,624 B1 | 8/2005 | Hoopes |
| 6,933,686 B1 | 8/2005 | Bishel |
| 6,934,300 B2 | 8/2005 | Tamasetti |
| 6,940,956 B1 | 9/2005 | Leach |
| 6,943,296 B2 | 9/2005 | Perret |
| 6,943,297 B2 | 9/2005 | Capella |
| 6,943,683 B2 | 9/2005 | Perret |
| 6,946,988 B2 | 9/2005 | Edwards |
| 6,955,560 B2 | 10/2005 | Biggs |
| 6,981,892 B1 | 1/2006 | Kostalnik |
| 6,993,289 B2 | 1/2006 | Janik |
| 7,003,102 B2 | 2/2006 | Kiko |
| 7,016,368 B2 * | 3/2006 | Binder .................. 370/436 |
| 7,023,809 B1 | 4/2006 | Rubenstein |
| 7,027,483 B2 | 4/2006 | Santhoff |
| 7,034,225 B2 | 4/2006 | Thompson |
| 2001/0030470 A1 | 10/2001 | Waugh |
| 2001/0039660 A1 | 11/2001 | Vasilevsky et al. |
| 2002/0021465 A1 | 2/2002 | Moore et al. |
| 2002/0031114 A1 | 3/2002 | Terry et al. |
| 2002/0038153 A1 | 3/2002 | Amodeo |
| 2002/0039388 A1 | 4/2002 | Smart et al. |
| 2002/0059634 A1 | 5/2002 | Terry et al. |
| 2002/0064039 A1 | 5/2002 | Clodfelter |
| 2002/0069417 A1 | 6/2002 | Kliger et al. |
| 2002/0097821 A1 | 7/2002 | Hebron et al. |
| 2002/0104009 A1 | 8/2002 | Zodnik |
| 2002/0116720 A1 | 8/2002 | Terry et al. |
| 2002/0150155 A1 | 10/2002 | Florentin et al. |
| 2002/0159402 A1 | 10/2002 | Binder |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0180592 A1 | 12/2002 | Gromov |
| 2002/0194383 A1 | 12/2002 | Cohen et al. |
| 2002/0194605 A1 | 12/2002 | Cohen et al. |
| 2003/0039257 A1 | 2/2003 | Manis |
| 2003/0061522 A1 | 3/2003 | Ke et al. |
| 2003/0062990 A1 | 4/2003 | Schaeffer et al. |
| 2003/0066082 A1 | 4/2003 | Kliger et al. |
| 2003/0099228 A1 | 5/2003 | Alcock |
| 2003/0107269 A1 | 6/2003 | Jetzt |
| 2003/0112965 A1 | 6/2003 | Mcnamara et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0207696 A1 | 11/2003 | Shpak |
| 2004/0013098 A1 | 1/2004 | Tseng et al. |
| 2004/0033817 A1 | 2/2004 | Gorsulch |
| 2004/0073597 A1 | 4/2004 | Caveney |
| 2004/0107445 A1 | 6/2004 | Amit |
| 2004/0121648 A1 | 6/2004 | Voros |
| 2004/0136384 A1 | 7/2004 | Cho |
| 2004/0147232 A1 | 7/2004 | Zodnik |
| 2004/0198236 A1 | 10/2004 | Paine et al. |
| 2004/0204017 A1 | 10/2004 | Eckel et al. |
| 2004/0268160 A1 | 12/2004 | Atkinson et al. |
| 2005/0047379 A1 | 3/2005 | Boyden et al. |
| 2005/0053087 A1 | 3/2005 | Pulyk |
| 2005/0073968 A1 | 4/2005 | Perlman |
| 2005/0076148 A1 | 4/2005 | Chan |
| 2005/0086389 A1 | 4/2005 | Chang |
| 2005/0125083 A1 | 6/2005 | Kiko |
| 2005/0136972 A1 | 6/2005 | Smith et al. |
| 2005/0152306 A1 | 7/2005 | Bonnassieux et al. |
| 2005/0152337 A1 | 7/2005 | Wurtzel et al. |
| 2005/0177640 A1 | 8/2005 | Rubinstein |
| 2005/0184915 A1 | 8/2005 | Nagel et al. |
| 2005/0194176 A1 | 9/2005 | Johnsen et al. |
| 2005/0208825 A1 | 9/2005 | Chan |
| 2005/0228889 A1 | 10/2005 | Cohen et al. |
| 2005/0245127 A1 | 11/2005 | Nordin |
| 2005/0272372 A1 | 12/2005 | Rodriguez |
| 2005/0273790 A1 | 12/2005 | Kearney |
| 2005/0281326 A1 | 12/2005 | Yu |
| 2006/0008817 A1 | 1/2006 | Chason |
| 2006/0079969 A1 | 4/2006 | Sequin |

| | | | |
|---|---|---|---|
| 2006/0104291 A1 | 5/2006 | Rodriguez | |

FOREIGN PATENT DOCUMENTS

| | | |
|---|---|---|
| EP | 0 241 152 A2 | 10/1987 |
| EP | 0241152 A | 10/1987 |
| EP | 0 961 466 | 12/1999 |
| EP | 1343253 A1 | 9/2003 |
| GB | 2368979 A | 5/2002 |
| JP | 55-132197 A | 10/1980 |
| JP | 56-087192 A | 7/1981 |
| JP | 57204655 A | 12/1982 |
| JP | 58206257 A | 12/1983 |
| JP | 07-336379 A | 12/1995 |
| JP | 09-084146 A | 3/1997 |
| WO | WO 96/23377 A1 | 8/1996 |
| WO | WO 97/50193 A | 12/1997 |
| WO | WO 98/02985 A | 1/1998 |
| WO | WO 00/07322 | 2/2000 |
| WO | WO 01/43238 A1 | 6/2001 |
| WO | WO 02/091652 A2 | 11/2002 |
| WO | WO 02/102019 A2 | 12/2002 |

* cited by examiner

LOCAL AREA NETWORK OF SERIAL INTELLIGENT CELLS

This is a continuation of copending parent application Ser. No. 10/178,223, filed Jun. 25, 2002, now U.S. Pat. No. 7,016,368 which itself is a continuation of U.S. patent application Ser. No. 09/123,486 filed Jul. 28, 1998, now U.S. Pat. No. 6,480,510, issued Nov. 12, 2002.

FIELD AND BACKGROUND OF THE INVENTION

The present invention relates to local area networks and, more particularly, to local area network topologies based on serial intelligent cells.

Bus Topology

Most prior art local area networks (LAN) use a bus topology as shown by example in FIG. 1. A communication medium 102 is based on two conductors (usually twisted pair or coaxial cable), to which data terminal equipment (DTE) units 104, 106, 108, 110, and 112 are connected, via respective network adapters 114, 116, 118, 120, and 122. A network adapter can be stand-alone or housed within the respective DTE.

This prior art bus topology suffers from the following drawbacks:

1. From the point of view of data communication, the medium can vary significantly from one installation to another, and hence proper adaptation to the medium cannot always be obtained.

2. The bus topology is not optimal for communication, and hence:
   a) the maximum length of the medium is limited;
   b) the maximum number of units which may be connected to the bus is limited;
   c) complex circuitry is involved in the transceiver in the network adapter;
   d) the data rate is limited.

3. Terminators are usually required at the ends of the medium, thus complicating the installation.

4. Only one DTE can transmit at any given time on the bus, and all other are restricted to be listeners.

5. Complex arbitration techniques are needed to determine which DTE is able to transmit on the bus.

6. In case of short circuit in the bus, the whole bus malfunctions, and it is hard to locate the short circuit.

7. Addresses should be associated independently with any network adapter, and this is difficult to attain with bus topology.

Star Topology

A number of prior art network devices and interconnections summarized below utilize star topology.

The multiplexer is a common item of equipment used in communication, both for local area networks and wide-area networks (WAN's). It is used in order to provide access to a data communications backbone, or in order to allow sharing of bandwidth between multiple stations. As shown in FIG. 2, one side of a multiplexer 202 is usually connected to a single high data rate connection 204 ("highway"), but several such connections can also be used. The other side of multiplexer 202 has multiple low data rate connections 206, 208, 210, 212, and 214. The ellipsis . . . indicates that additional connections can be made. Each low data rate connection uses part of the bandwidth offered by the high data rate connection. These low data rate connections can be of the same type or different types, and can have different or identical data rates. The multiplexing technique most commonly used is time-domain multiplexing (TDM). However, frequency-domain multiplexing (FDM) is also used.

A popular multiplexer in use is the voice multiplexer, shown in FIG. 3. A pulse-code modulation (PCM) bus 304 handling 2.048 megabits per second, containing 30 channels of 64 kilobits per second is connected to one side of a PABX/PBX 302, and up to 30 telephone interfaces 308, 312, and 316 are connected to the other side via connections 306, 310, and 314. The ellipsis . . . indicates that additional connections can be made. In this configuration, each channel in the PCM bus can be switched or be permanently dedicated to a specific telephone line. An example of such system is disclosed in U.S. Pat. No. 3,924,077 to Blakeslee.

Similarly a small private branch exchange (PABX/PBX), as shown in FIG. 4, is widely used (usually in an office or business environment) where several outside lines 403, 404, and 405 are connected to one side of a PABX/PBX 402, and multiple telephones 408, 412, and 416 are connected to the other side via lines 406, 410, and 414, respectively. The ellipsis . . . indicates that additional connections can be made. The PABX/PBX connects an outside line to a requesting or requested telephone, and allows connection between telephones in the premises.

In the configurations described above, star topology is used in order to connect to the units to the multiplexer, which functions as the network hub. The disadvantages of star topology include the following:

1. A connection between each unit and the network hub is required, and the wiring required for this connection can involve a lengthy run.

Thus, when adding new unit, an additional, possibly lengthy, connection between the new unit and the network hub must be added.

2. No fault protection is provided: Any short circuit or open circuit will disrupt service to the affected units.

3. The multiplexer can impose extensive space and power requirements.

Computer Interfaces

Various interface standards have been established in order to allow interoperability between the PC (personal computer) or workstation and its various connected elements. These standards usually relate to both mechanical and electrical interfaces, and include industry standard architecture (ISA), extended industry standard architecture (EISA), Personal Computer Memory Card Industry Association (PCMCIA), intelligent drive electronics (IDE), small computer system interface (SCSI), and others. Each added hardware unit usually utilizes a specific software driver for interoperability with the specific platform. These protocols are applicable to small distances only, and allow units to be housed within or nearby the PC or workstation enclosures. For example, equipping a PC for video capture could involve a plug-in ISA card housed within the PC on the motherboard, a video camera connected to the card, and a software driver. This configuration does not allow remote video monitoring.

Relevant Prior Art

The use of the same wire pair or pairs for both power and data communication is well known, and is widely used in telecommunications, from "Plain Old Telephone Service" ("POTS") to Integrated Services Digital Network (ISDN) and broadband services in the local-loop including other Digital Subscriber Line (XDSL) technologies. Such a concept is described, for example, in U.S. Pat. No. 4,825,349 to Marcel, describing using two pairs for such a scheme. A DC-to-DC converter for such DC feeding is described, for example, in U.S. Pat. No. 4,507,721 to Yamano et al.

The concept of power line communication (PLC) is also widely known. However, in most cases the connection is similar to a LAN environment, in which a single transmitter occupies the entire medium. Examples of such techniques include X-10 and the consumer electronics bus (CEBus, described in the EIA-600 standard). Much of this technology uses complex spread-spectrum techniques in order to accommodate problematic media (characterized by high amounts of noise and interference). Even with such improved technologies, however, the data rate obtained is relatively low.

Prior art in this field includes U.S. Pat. No. 5,684,826 to Ratner, U.S. Pat. No. 5,491,463 to Sargeant et al., U.S. Pat. No. 5,504,454 to Daggett et al., U.S. Pat. No. 5,351,272 to Abraham, U.S. Pat. No. 5,404,127 to Lee et al., U.S. Pat. No. 5,065,133 to Howard, U.S. Pat. No. 5,581,801 to Spriester et al., U.S. Pat. No. 4,772,870 to Reyes, and U.S. Pat. No. 4,782,322 to Lechner et al. Other patents can be found in U.S. Class 340/310 (sub-classes A/R and others) and International Class H04M 11/04.

The concept of using existing telephone wiring also for data communication is first disclosed in U.S. Pat. No. 5,010,399 to Goodman et al., where video signals superimposed over the telephone signals are used. However, the scheme used is of the bus type and has the drawbacks of that topology. Similarly, the idea of data transmission over a public switched telephone network (PSTN) using the higher frequency band is widely used in the XDSL systems, as is disclosed in U.S. Pat. No. 5,247,347 to Litteral et al. The patent discloses an asymmetric digital subscriber line (ADSL) system. However, only a single point-to-point transmission is described over the local-loop, and existing in-house wiring is not discussed, and thus this prior art does not disclose how to configure a full multipoint network. Multiplexing XDSL data and the POTS/ISDN data uses FDM principles, based on the fact that the POTS/ISDN services occupy the lower portion of the spectrum, allowing for the XDSL system to use the higher bandwidth.

A home bus network using dedicated wiring is disclosed in U.S. Pat. No. 4,896,349 to Kubo et al., and a home automation network based on a power line controller (PLC) is disclosed in U.S. Pat. No. 5,579,221 to Mun. U.S. Pat. No. 4,714,912 to Roberts et al. is the first to suggest communicating data over power lines not in bus topology but as 'break-and-insert'. However, only single conductor is used, and the receivers are all connected again using a bus topology.

In addition, U.S. patent application Ser. No. 08/734,921, Israel Patent Application No. 119454, and PCT Patent Application No. PCT/IL97/00195 of the present inventor disclose a distributed serial control system of line-powered modules in a network topology for sensing and control. These documents, however, do not disclose a local area network for data communications.

The prior art documents mentioned above are representative examples in the field. Certain applications are covered by more than one issued patent.

There is thus a widely recognized need for, and it would be highly advantageous to have, a means of implementing a local area network for data communications which does not suffer from the limitations inherent in the current methods. This goal is met by the present invention.

SUMMARY OF THE INVENTION

The present invention is of a local area network for data communication, sensing, and control based on serially connected modules referred to as "serial intelligent cells" (SIC's). An example of a local area network of such devices according to the present invention is illustrated in FIG. 7, to which reference is now briefly made. In this example, SIC's 700, 702, 704, 706, and 708 are connected by one or more conducting wire pairs (such as a twisted pair 710). This allows chaining, such as SIC 700 to SIC 702 to SIC 704. However, SIC 700, SIC 706, and SIC 708, located at the ends are equipped with single connection. SIC 704 is equipped with three connections, and even more connections are possible. A SIC may be interfaced to one or more DTE's, as illustrated by a DTE 714 interfaced to SIC 700 and by DTE's 716 and 718 interfaced to SIC 704. SIC's need not have an interface, however, as is illustrated by SIC 706 and SIC 702. SIC 702, though, serves as a repeater, connecting SIC 700 and SIC 704. It is to be noted that the networks according to the present invention utilize electrically-conducting media to interconnect the SIC's. Each electrically-conducting medium connects exactly two SIC's into a communicating pair of SIC's which communicate bidirectionally and independently of other communicating pairs in the local area network. Electrically-conducting media are media which transmit signals by conducting electrical current or by propagating electrical potential from one point to another. Electrically-conducting media include, but are not limited to wires, twisted pair, and coaxial cable. But electrically-conducting media do not include media such as fiber optic lines, waveguides, microwave, radio, and infrared communication media.

As noted above, SIC's in a communicating pair communicate bidirectionally. For example, SIC 704 can initiate communication (as a sender) to SIC 702 (as a receiver), but SIC 704 can just as well initiate simultaneous communication (as a sender) to SIC 700 (as a receiver). Bidirectional communication can take place simultaneously, and herein is taken to be equivalent to "full duplex" communication. In addition, as noted above, the communication between the SIC's of a communicating pair is independent of the communication between the SIC's of any other communicating pair, in that these communications neither preclude nor affect one another in any way. Furthermore, every communication between SIC's is a "point-to-point communication", which term herein denotes a communication that takes place between exactly one sender and exactly one receiver. This is in contrast to a bus-based communication, in which there are many (potential) receivers and many (potential) senders. Consequently, in the topology according to the present invention, there is automatically a termination in the physical layer at each end of a connection (a SIC), both simplifying the installation and insuring more reliable communication.

The topology according to the present invention is superior to the prior art bus topology in the following ways:

1. There is no physical limit to the number of SIC's which may be installed in the network, and hence no physical limit to the number of DTE's in the network.

2. Point-to-point communication allows higher data rates over greater distances.

3. Point-to-point communication requires less complex circuitry than bus circuitry.

4. Several SIC's can transmit and receive simultaneously. For example, SIC 700 can communicate with SIC 702 while SIC 704 communicates simultaneously with SIC 706.

5. There is no need for arbitration, allowing more efficient utilization of the network. Furthermore, priorities can be assigned to each SIC or, alternatively, to each specific message to allow the data routing to take care of priorities.

6. Addresses may be assigned by the network.

7. In the case of failure of any conductor or SIC, the network can sense the fault immediately, and the specific location of the fault (up to the specific SIC pair) is easily obtained.

Therefore, according to the present invention there is provided a local area network for data communication, sensing, and control including a plurality of serial intelligent cells interconnected exclusively by electrically-conducting media into at least one communicating pair, wherein: (a) each of the electrically-conducting media interconnects no more than two of the serial intelligent cells; (b) each of the communicating pair includes one of the electrically-conducting media and exactly two of the serial intelligent cells; (c) each of the communicating pair engages in a communication exclusively over the electrically-conducting media; and (d) each of the communicating pair engages in the communication bidirectionally and independently of the communication of any other of the communicating pair.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a local area network according to the present invention may be better understood with reference to the drawings and the accompanying description.

Figure 1:
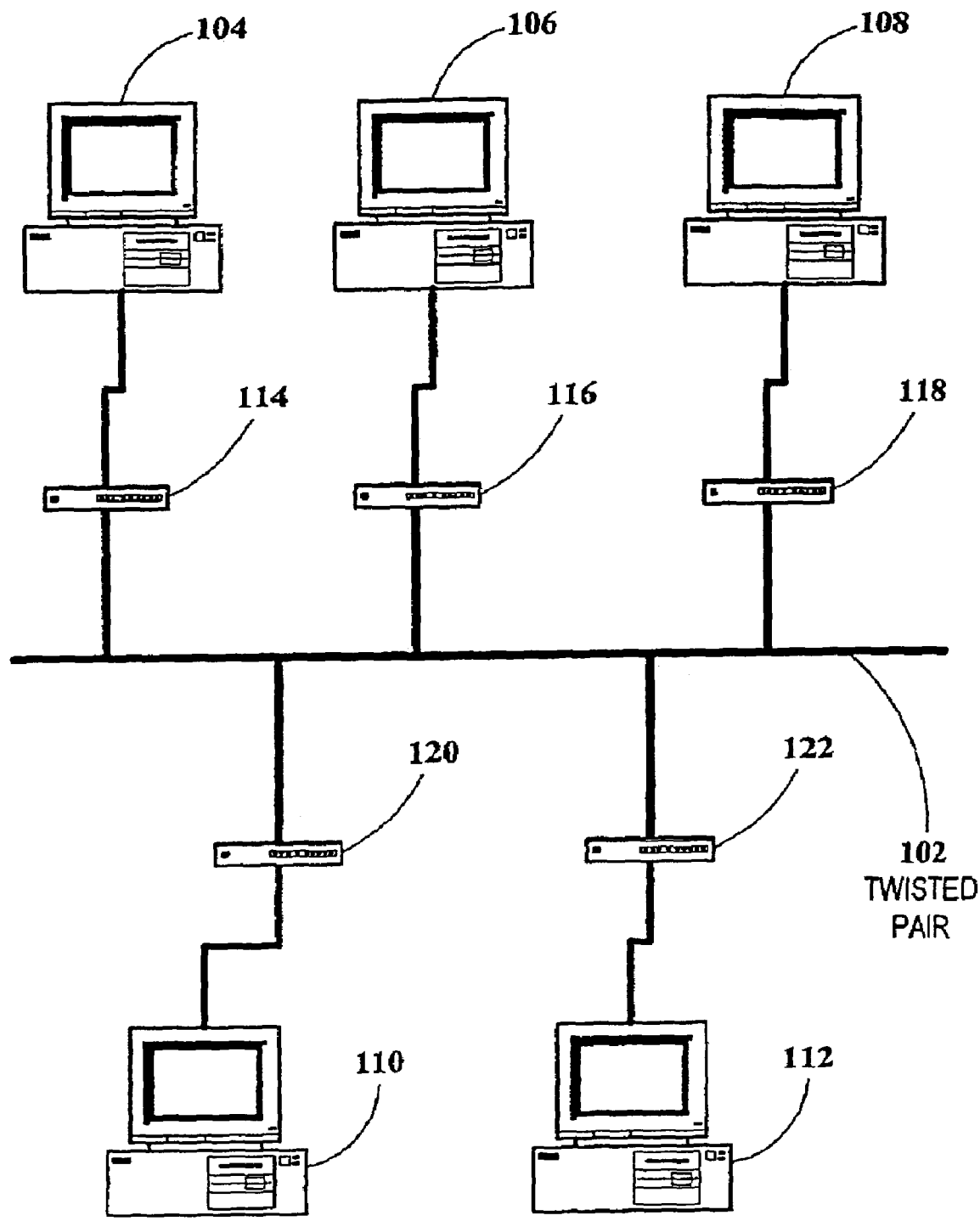
FIG. 1 shows a common prior art LAN bus topology.
Figure 2:
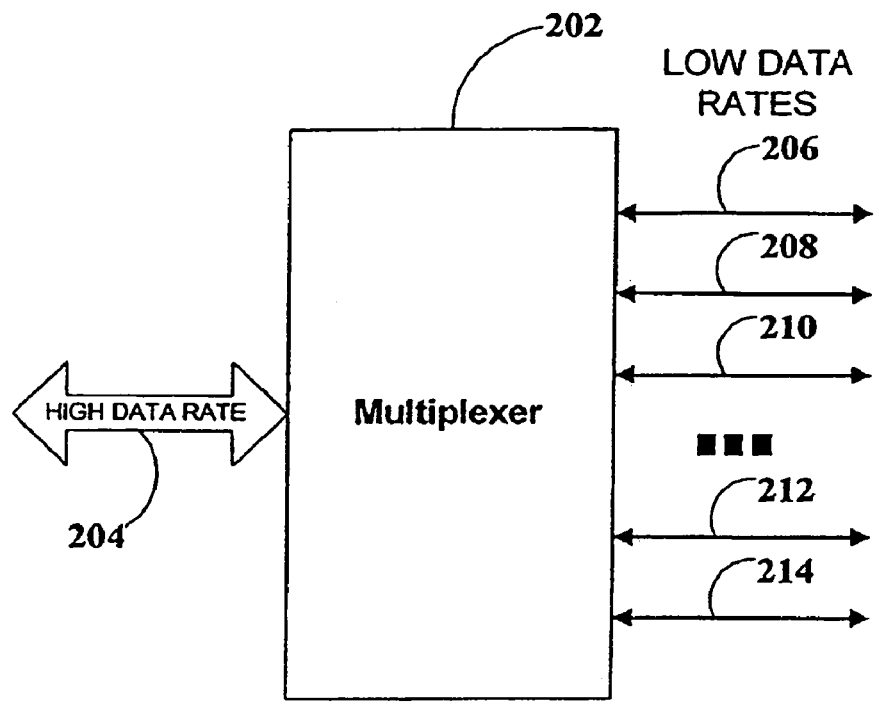
FIG. 2 shows a typical prior art multiplexer.
Figure 3:
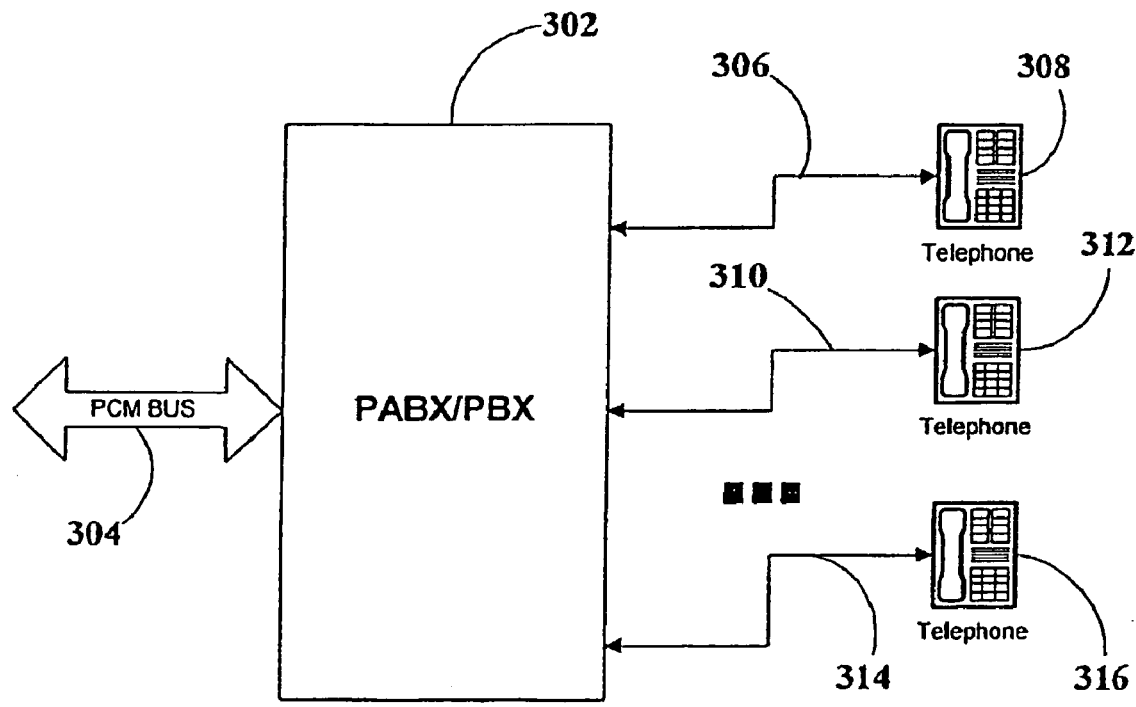
FIG. 3 shows a prior art voice multiplexer (star topology).
Figure 4:
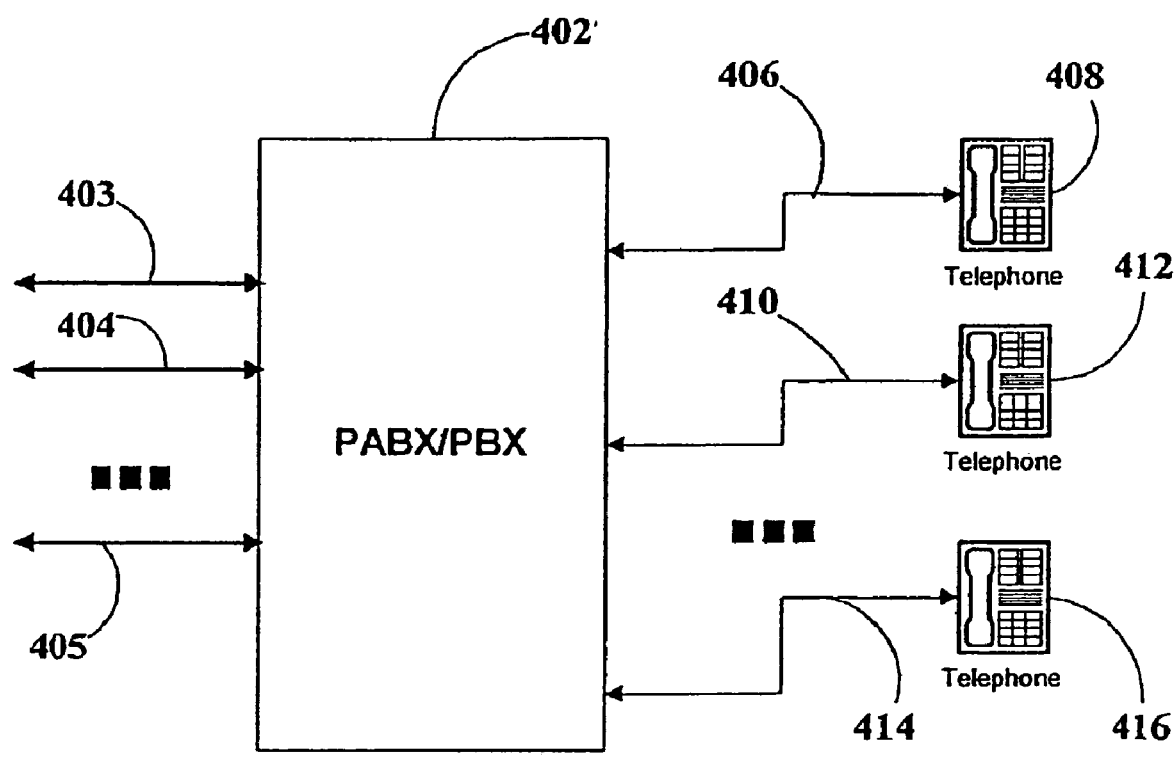
FIG. 4 shows a prior art voice exchange configuration (star topology).
Figure 5:
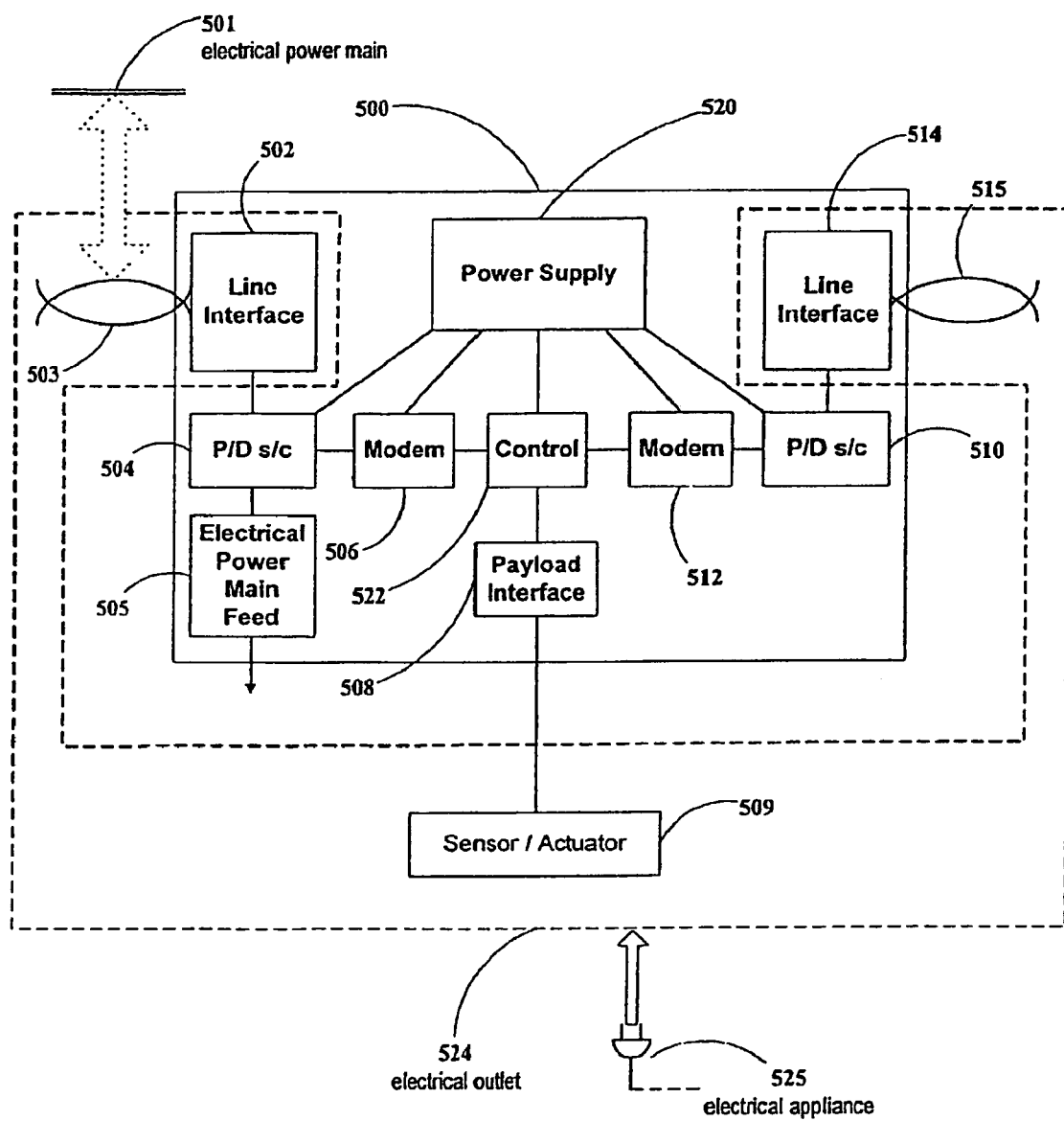
FIG. 5 is a block diagram of a SIC for control applications according to the present invention.

FIG. 5 is a block diagram of a representative SIC 500 for use in control applications. A first line interface 502 is a first port for connecting to the previous SIC to receive incoming electrical power and local area network data over electrically-conducting medium 503, which may optionally be connected to an electrical power main 501, so that SIC 500 may be powered from electrical power main 501. Line interface 502 may include the connector, fuse, lightning arrester and other protection such as noise filters, etc. The incoming power/data signal is fed to a first power/data splitter/combiner 504, which de-couples the (high frequency alternating current) data signal from the power. Such a power/data splitter/combiner 504 (denoted for brevity in FIG. 5 as "P/D s/c") can be implemented by methods well-known in the art, such as using a center-tap transformer, or alternatively with active components. The data signal is fed to a first modem 506 allowing bidirectional communication, while the power is fed to a power supply 520. The above scheme assumes that both power and data are carried by the same network wires (line-powering). FIG. 5 illustrates the case where the SIC is line-powered by alternating current (for example, by the electrical power main), in which case power/data splitter/combiner 504 is an AC power/data splitter/combiner, which separates a low-frequency alternating current power from the higher-frequency data signal. Otherwise, in the case where the SIC is line-powered by direct current, power/data splitter/combiner 504 is a DC power/data splitter/combiner, which separates direct current power from the data signal. In some cases the line-powering method is not used. For example, power can be carried by dedicated lines routed in conjunction with the data wiring. Alternatively, the SIC can be locally powered by a local power-supply. In both cases, the power/data splitter/combiner is not required, and the power lines are directly connected to the SIC power-supply, while the data connects directly to the modems. Parts of the SIC are shown optionally housed within an electrical outlet 524, such that connections to the local area network as well as to the electrical power mains may be made from electrical outlet 524. Electrical power from electrical outlet 524 can be fed to an optional electrical appliance 525. In addition, SIC 500 contains an optional electrical power main feed 505 which can also power electrical appliances or other devices.

Power-supply 520 provides the required voltages for the SIC and payload operation, and also outputs the power to a second Power/data splitter/combiner 510, for coupling to the next SIC. Communication with the next (fed) SIC is performed via a second modem 512 connected to a second line interface 514 via power/data splitter/combiner 510, similar to power/data splitter/combiner 504 as previously described. Line interface 514 feeds to electrically-conducting medium 515, which connects to the next SIC. Modems 506 and 512 can be standard RS-485, RS-232, or any simple similar data interface transceiver. Alternatively, a complex transceiver can be used for achieving long ranges or high-speed operation. CPU and firmware contained in a control block 522 control and monitor the unit operation and communication, as well as control the payload through a payload interface 508 interfacing with a payload illustrated by a sensor/actuator 509. For example, interface 508 can implement a 4–20 ma standard interface. In a similar way, SIC 500 can be used for communication over the power line. To do this, payload interface 508 is replaced by a communication port and sensor/actuator 509 will be replaced by a DTE.

Figure 6:
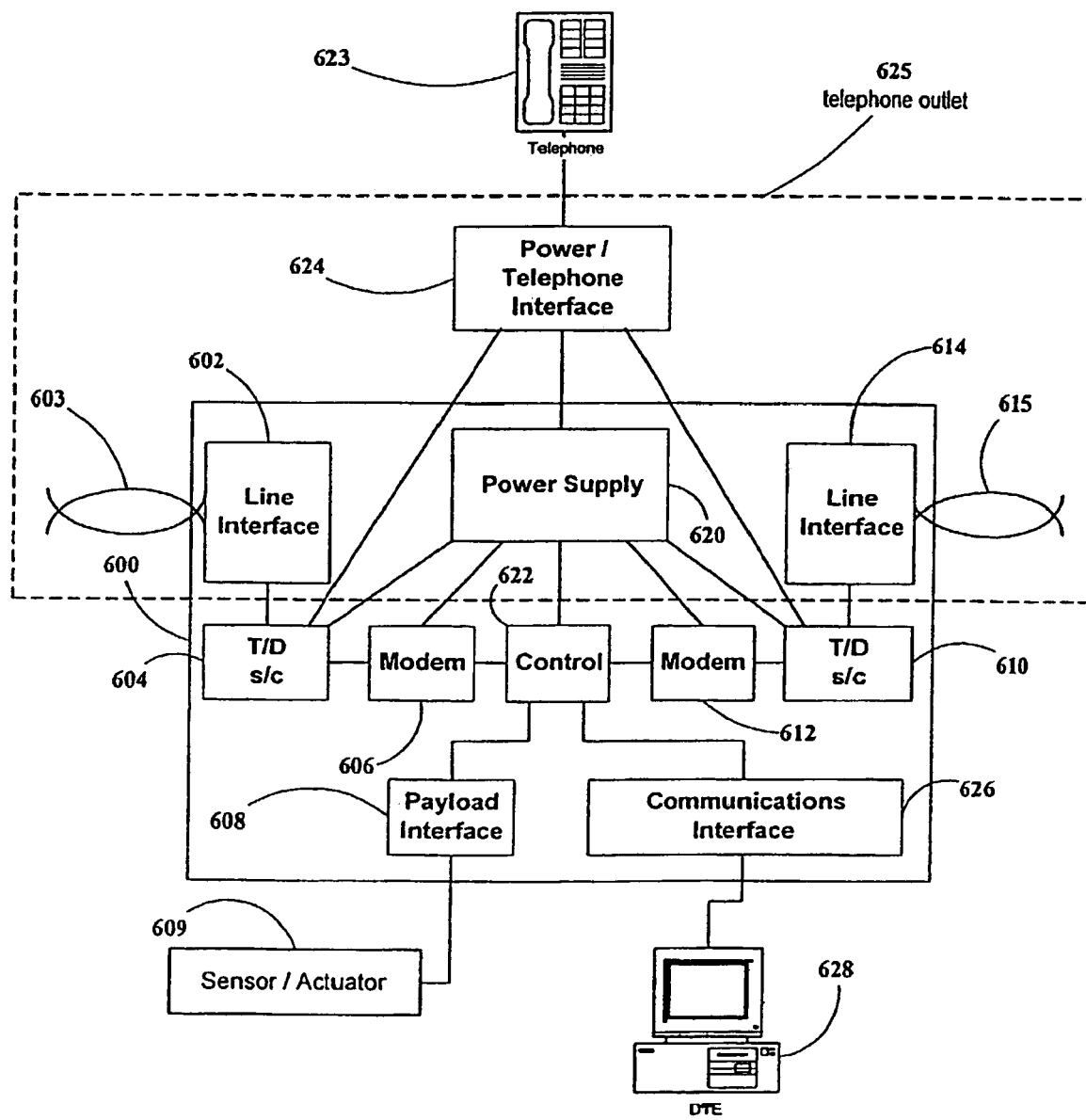
FIG. 6 is a block diagram of a SIC for data communications according to the present invention.

A SIC for use in data communications as shown in FIG. 6 is substantially similar to that used in control applications as shown in FIG. 5, but has some specific differences as noted. Also illustrated in FIG. 6 is the case where the local area network data is carried over electrically-conducting media which are part of the telephone wiring of a building. A SIC 600 has a first line interface 602 as a first port for connecting to the previous SIC to receive incoming power, local area network data, and telephony data via an electrically-conducting medium 603. Line interface 602 may include the connector, fuse, lightning arrester and other protection such as noise filters, etc. The incoming power/telephony/data signal is fed to a first telephony/data splitter/combiner 604 (denoted for brevity in FIG. 6 as "T/D s/c"), which de-couples the local area network data from the power and telephony data. Such a telephony/data splitter/ combiner 604 can be implemented by methods well-known in the art, such as using a high-pass/low pass filter, or alternatively with active components. The local area network data signal is fed to a first modem 606 allowing bidirectional communication, while the power (DC) is fed to a power supply 620, and the telephony data is fed to power/telephone interface 624.

Power-supply 620 provides the required voltages for the SIC and payload operation, and also outputs the power to a second telephony/data splitter/combiner 610, for coupling to the next SIC. Communication with the next (fed) SIC is performed via a second modem 612 connected to a second line interface 614 via telephony/data splitter/combiner 610, similar to telephony/data splitter/combiner 604 as previously described. Line interface 614 connects to an electrically-conducting medium 615, which connects to the next SIC. Modems 606 and 612 can be standard RS-485, RS-232 or any simple similar data interface transceiver. Alternatively, a complex transceiver can be used for achieving long ranges or high-speed operation. CPU and firmware contained in a control block 622 control and monitor the unit operation and communication, as well as control the payload through a payload interface 608 interfacing with a payload 609, which may include sensors and actuators. For example, interface 608 can implement a 4–20 ma standard interface. SIC 600 also includes an optional power/telephone interface 624, contained for example in a telephone outlet 625, as well as one or more communications interfaces, such as a communication interface 626 connected to a DTE 628.

In the case of DC line feeding, the power supply may be equipped with a line reversal function (for example, a diode-based bridge) in order to accommodate a possible wire reversal.

Note that a SIC can be implemented as single device with all component parts contained within one enclosure, but does not necessarily have to be so implemented. In the case of a SIC used for data communications or control applications, the hardware may be optionally divided between the SIC module and the DTE/Payload units. In the case of a SIC used for telephone applications, the hardware may optionally be divided between the SIC, the DTE payload unit, and the telephone outlet, such as telephone outlet 625, which allows connections to both telephone services (such as through a telephone 623) and the local area network (such through DTE 628). Telephone outlet 625 may be a wall outlet or jack. All or part of the SIC may be housed within a telephone outlet such as telephone outlet 625, if desired. Furthermore, for SIC's used only as repeaters, a payload interface is not necessary.

Power/data splitter/combiner 510 (FIG. 5) can use various techniques known in the art. Coupling can be implemented, for example, as disclosed in U.S. Pat. No. 4,745,391 to Gajjar. Power-supply 520 (FIG. 5) can be connected to the network using dedicated adapter or via specific SIC. The payload can also be connected using standard Ethernet or other LAN interface, hence emulating the network using the SIC's. This configuration makes use of standard interfaces, but operates at higher throughput and data-rates than a conventional LAN.

SIC Addressing

A SIC can include an address. Addresses of SIC's on the network can be assigned via automatic assignment by the local area network itself by algorithms known in the art, for example as disclosed in U.S. Pat. No. 5,535,336 to Smith et al. Addresses can also be assigned via manual assignment, such as by the setting of mechanical switches on the SIC unit. Addresses can also be determined by the DTE connected to the SIC, either by means of higher layers as done in most LAN systems, or physically be means of the connection to the SIC (such as by address lines).

SIC Powering

Figure 7:
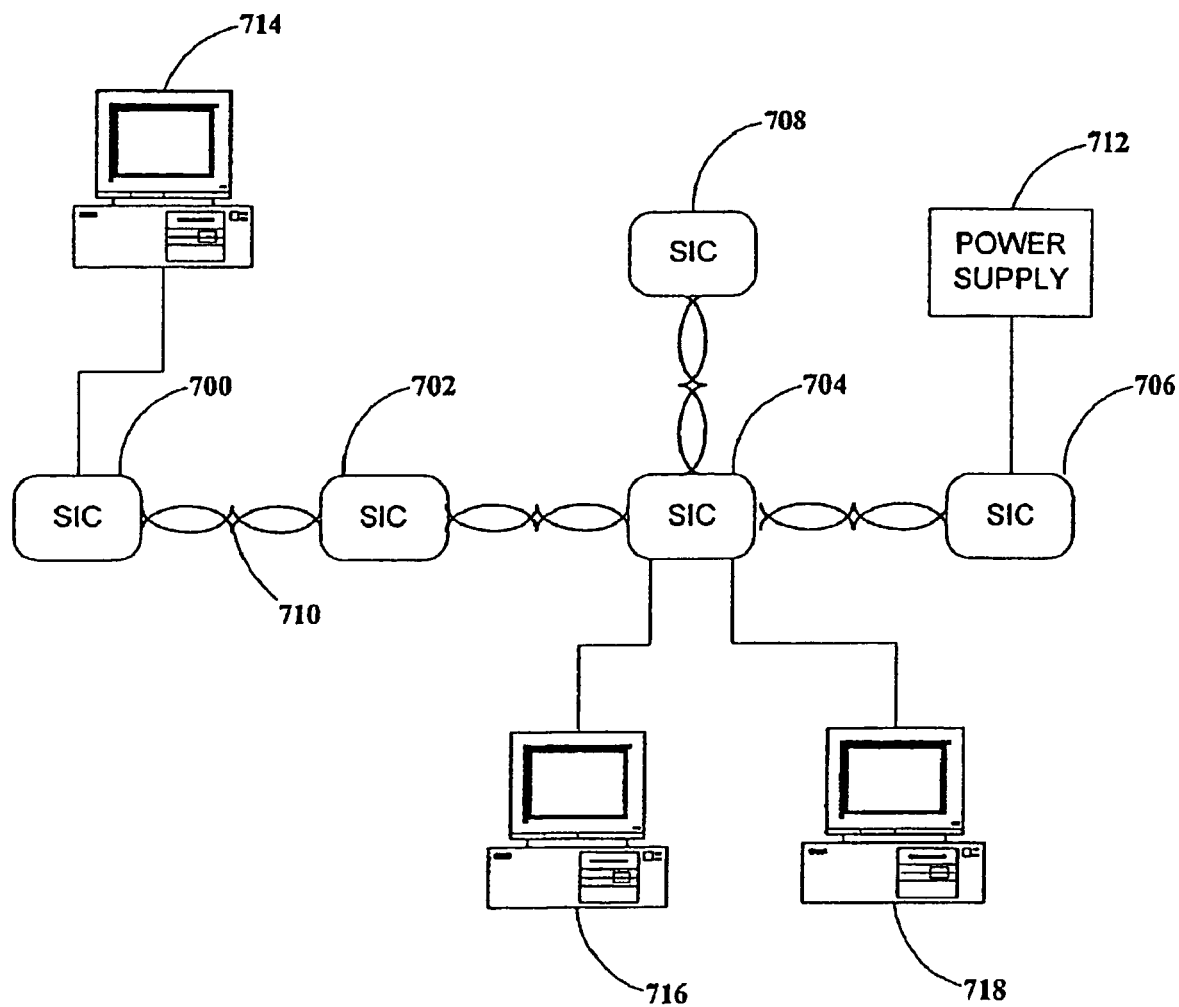
FIG. 7 shows a LAN topology utilizing the devices of the present invention.

A SIC can receive electrical power locally, via a power source located near the SIC. However, one power source may be used to power some or all the SIC's in the local area network using dedicated power lines. These lines can be routed with the data communication wires. Alternatively, the same electrically-conducting media (the data communication wires) can be used to carry both electrical power and local area network data to the SIC's, by means of techniques well-known in the art, for example as in telephone systems. In such a case, a unit is required for coupling the power supply to the local area network. This can make use of a SIC (such as SIC 706 in FIG. 7) or in a specific dedicated module. Since electrical power is typically distributed at low frequencies (e.g., 60 Hertz), whereas local area network data is typically at a much higher frequency, electrical power can be combined with local area network data using frequency-domain multiplexing. A SIC can therefore be powered from the electrical power mains, and can also deliver electrical power, as illustrated in FIG. 5 and detailed herein above.

The DTE's, sensors, and actuators connected to the SIC's can also be locally powered from the SIC's, or can use the same power resources via the same channels as the SIC's. Part or all of a SIC can be housed within an electrical outlet so that the electrical outlet allows connection to the local area network as well as to electrical power.

Control

Although mainly intended to be used as communication network, the system according to the present invention can also be used as a platform to implement a sensing, control, and automation system. This is achieved by adding to one or more of the SIC's interfaces to sensors or actuators. The signals received by the sensors are transmitted over the network via logic contained in the SIC's or in the DTE's, which thereupon operate the relevant actuators. This automation function can be monitored by one or more of the DTE'S.

The operation of the control may be associated with data communicated over the network (for example, sensing the availability of power to a DTE) or may be independent of it, to allow control decisions to be made locally.

DTE Interface

The DTE interface can be a proprietary interface or any standard serial or parallel interface, such as ITU-T V.35, ITU-T V.24, etc. In addition, a telephone interface (POTS) or ISDN may be used. This can suit intercom or PBX applications.

Fault Protection

Figure 8:
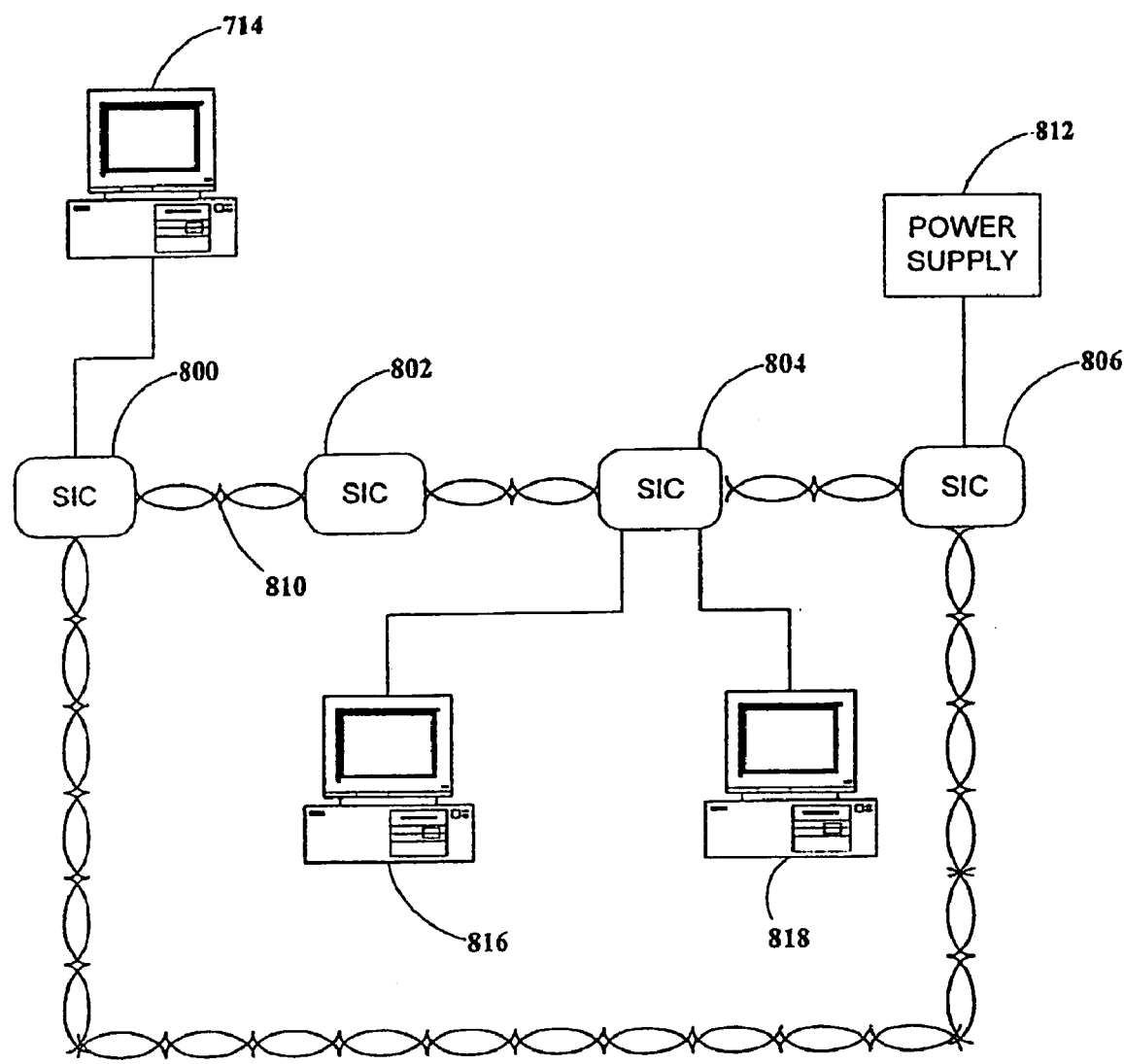
FIG. 8 shows an alternative LAN topology utilizing the devices of the present invention.

The SIC topology described above can be modified to allow for single failure correction. In such a case, the SIC's are connected in a network with redundant paths, such as a circular topology as shown in FIG. 8. In this example, a SIC 800 is connected to a SIC 802, which is in turn connected to a SIC 804, which is in turn connected to a SIC 806, which is in turn connected to SIC 800. When connected in such configuration, any single failure in any conductor, such as in conductor pair 810, will not effect the system operation, as data routing from any SIC to any other SIC can be achieved via an alternate path. The term "circular topology" herein denotes the topology of any local area network of SIC's according to the present invention which contains at least two communication paths between two different SIC's. For example, in FIG. 8, there are two communication paths from SIC 800 to SIC 804: one communication path is from SIC 800 to SIC 802 to SIC 804, and the other path is from SIC 800 to SIC 806 to SIC 804. Circular topology provides redundant communication paths that increase the immunity of the local area network to communication faults. It should be noted that the circular topology according to the present invention, as shown in FIG. 8, differs significantly from the well-known "Token Ring topology" of the prior art, as discussed following.

Although circular topology as defined herein can be superficially similar to the Token Ring topology, there are major differences between them. One difference is in the data framing. The Token Ring uses the same frame structure throughout all communication links in the network, and this requires that the same framing must be recognized by all the cells in the network. In the SIC network according to the present invention, however, each communication link (between any two connected SIC's) is totally independent from all other network communication. Hence, a first SIC can communicate with a second SIC using one type of frame structure and protocol, while the same first SIC can communicate with a third SIC using a different type of frame structure and protocol.

In addition, in a Token Ring network, there is single direction of data flow at any given time from a single transmitter to one or more receivers, and usually, the direction of data flow is constant. The SIC network according to the present invention, however, does not impose any limitation on the data flow in any of the communication links. Full duplex, half duplex or unidirectional communication is possible, and can even vary from link to link throughout the network. This allows the SIC network to support two independent communication routes simultaneously, provided different segments are used. In FIG. 8, for example, SIC 800 can communicate with SIC 802 while SIC 804 simultaneously communicates different data with SIC 806. This capability is not supported by any of the other network configurations.

The above differences affect, for example, the vulnerability of the respective networks to faults. In case of single break or short-circuit anywhere in the medium, the Token Ring network will collapse, disabling any further communication in the system. As another example, in the network disclosed in U.S. Pat. No. 4,918,690 to Markkula et al. (hereinafter referred to as "Markkula"), this fault affects the physical layer by disabling the media's signal-carrying capability. The Token Ring network will not function at all since the data layer functionality based on unidirectional transmission will not be supported. In contrast, however, a SIC network according to the present invention, will continue to function fully, except for the specific faulty link itself. All other links continue to function normally. Furthermore, the ability to localize the fault is not easily performed either in a Token Ring network or in the Markkula network. In the SIC network according to the present invention, however, it is simple and straightforward to trace the fault to the affected link.

Data Distribution over Electrical Power Lines

An important configuration for a network according to the present invention uses the electrical power wiring of a building as a communication media. This can be used, for example, to implement an inexpensive 'home LAN'. Typical house mains have a connection to single feeder with numerous distribution points and outlets. The principles according to the present invention specify a SIC to be located within each outlet and at each distribution point. This will allow SIC-based communications network, where communication takes place between each pair of SIC's connected via the wiring. In such a case it is also expected that the mains will also be used to power the SIC's. Aside from using the same wiring media, the electrical distribution and the communication system sharing the same mains can be totally decoupled.

Another configuration involves adding the SIC to the Mains wiring at points distinguished from the mains outlets. The preferred embodiment, however, consists of using the outlets points for both the electrical supply and the DTE connection points. This involves replacing all electrical outlets and distribution points with 'smart' outlets, having both electrical connections and a communications jack. In addition, such unit may include visual indicators (e.g. LED's) to show the communication status, and may also include switches or other means to determine the outlet address. Such a communication system could be used for applications associated with power distribution, as for example to control the load connected to a specific outlet, for remote on/off operation of appliances, timing of operations, delayed start, disconnection after pre-set time period, and so forth. Such a communication system could also be used to monitor the power consumed by specific outlets, such as for Demand Side Management (DSM) or Automatic Meter Reading (AMR), allowing remote meter reading.

The above described topology may also apply to existing wiring. One common example may be power wiring to consumers located in different locations. Such wiring typically relies on bus topology with taps. In order to use SIC technology, the wiring must be broken, and a SIC installed between both ends.

In a similar manner, a communication network employing the electrical power wiring of vehicles and vessel can be implemented, such as for aircraft, ships, trains, buses, automobiles, and so forth.

Implementing a Local Communication/Telephone System Using SIC's

In this application, existing telephone wiring (either POTS or ISDN) is used as the electrically-conducting media for the local area network, and is used for both local area network data communication and for telephony. The term "telephony" herein denotes any telephone or telephonic communication, including both including voice (POTS) and data (ISDN). Telephone outlets are usually connected in point-to-point topology without a distribution point. To set up a network, each outlet is replaced with SIC-based outlet. If there are distribution points, these distribution points must also be SIC equipped. This configuration results in a high-performance LAN between the telephone outlets. Aside from sharing the same media, the local area network can be decoupled from the telephone system. Alternatively, the local area network and the telephone system can be combined, such that telephony is digitally integrated into the local area network data.

The outside telephone service can be treated according to one of the following alternatives:

1. No telephone support. In this configuration, the connection to the network (usually to the public network) is cut, and the network is fully internal, with no external telephone service.

2. Telephone as Payload. In this configuration, the telephone capability is retained, and telephony data may be integrated into the data communication of the local area network. One of the SIC's (usually the one closest to a public telephone network interface) or other dedicated module interconnects (via the communication interface for example) to the network interface (NI). This unit emulates a telephone interface to the NI, so that public network operation is transparent and continues to perform as normal. However, the signals associated with the telephone interface, either the voice itself and the control/signaling (on hook/off hook, ringing, etc.) are digitized and transmitted in the network as data stream, as part of the communication taking place in the network. In the SIC's interfaced to telephones, these signals are converted back to analog (or in any original form) and thus can be used with standard telephones. In this case, telephone functionality is fully retained. However, failure in the communication network may result in loss of the telephone service. This can be improved by means of a system which disconnects the SIC's circuitry and restores the original wiring routing (this can be easily implemented by relays, which bypass the SIC's upon failure detection, manual intervention, or other relevant occasion).

3. Communication over POTS or ISDN. In this method, the electrically-conducting media interconnecting SIC's is the telephone wiring of a building. This method involves the known mechanism 'POTS Splitting', currently used in conjunction with xDSL technologies. This requires a filter which separates the low-frequency portion of the spectrum (usually carrying the POTS associated signals and power) from the high-frequency portion of the spectrum (used for communication). In such an application, the AC/DC units in the SIC are replaced with such POTS splitter modules. The low-frequency band (POTS related) is passed transparently (similar to the power pass), and branched to the telephone jack. The high-frequency band is used for the communication between the SIC's. This combining of high-frequency local area network communication on the same electrically-conducting media with low-frequency telephony data is a form of frequency-domain multiplexing.

In the latter two alternatives, each in-wall telephone outlet is replaced with a SIC based outlet having both a telephone jack and one (or more) communication jacks.

Computer Bus Extender

Figure 10:
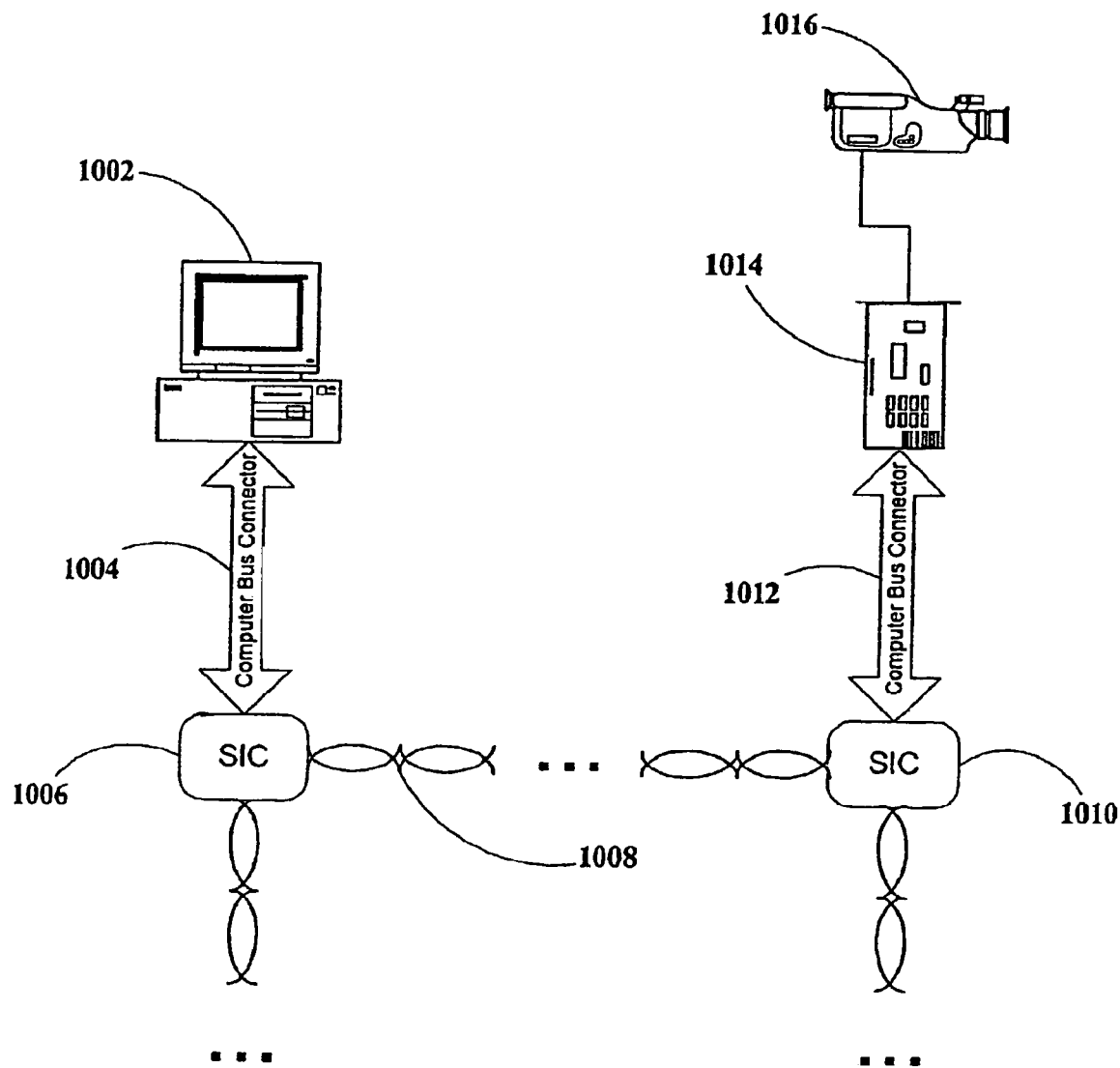
FIG. 10 shows a local area network according to the present invention used as a computer bus extender.

The SIC network can be used as a computer bus extender, such as an 'ISA bus extender', as illustrated in FIG. 10. In this configuration, a SIC 1006 is equipped with a computer bus connector 1004 which is connected, for example, to one of the ISA bus slots in a computer 1002, to transport data between the local area network and computer 1002. Another SIC 1010, remotely located, also has a computer bus connector 1012, such as an ISA bus extender. This allows for a transparent ISA bus capability, where the ISA bus data will be transported in both directions over electrically-conducting medium 1008. The ellipses ( . . . ) indicate that additional SIC's and electrically-conducting media may be present in the local area network between SIC 1006 and SIC 1010. Shown as an example, a video frame grabber card 1014 is plugged into computer bus connector 1012, and a video camera 1016 is connected to video frame grabber card 1014. Normally, video frame grabber card 1014 is plugged directly into an ISA bus slot, such as in computer 1002. Here, however, the local area network acts as a bus extender so that video frame grabber 1014 and video camera 1016 can be located remotely from computer 1002. The normal software driver for the ISA bus slot in computer 1002 can used, since computer 1002 is unaware of the fact that only ISA emulation is taking place. This way, the capability of having general remote PC components and peripherals can be easily achieved. This configuration features the above-described advantages, and this method can be used to attain various goals, such as fault protection. Similarly, this method can be used to connect several units remotely to a computer, using different ports in the computer.

Implementing Multiplexers and PABX/PBX Functionality

Figure 9:
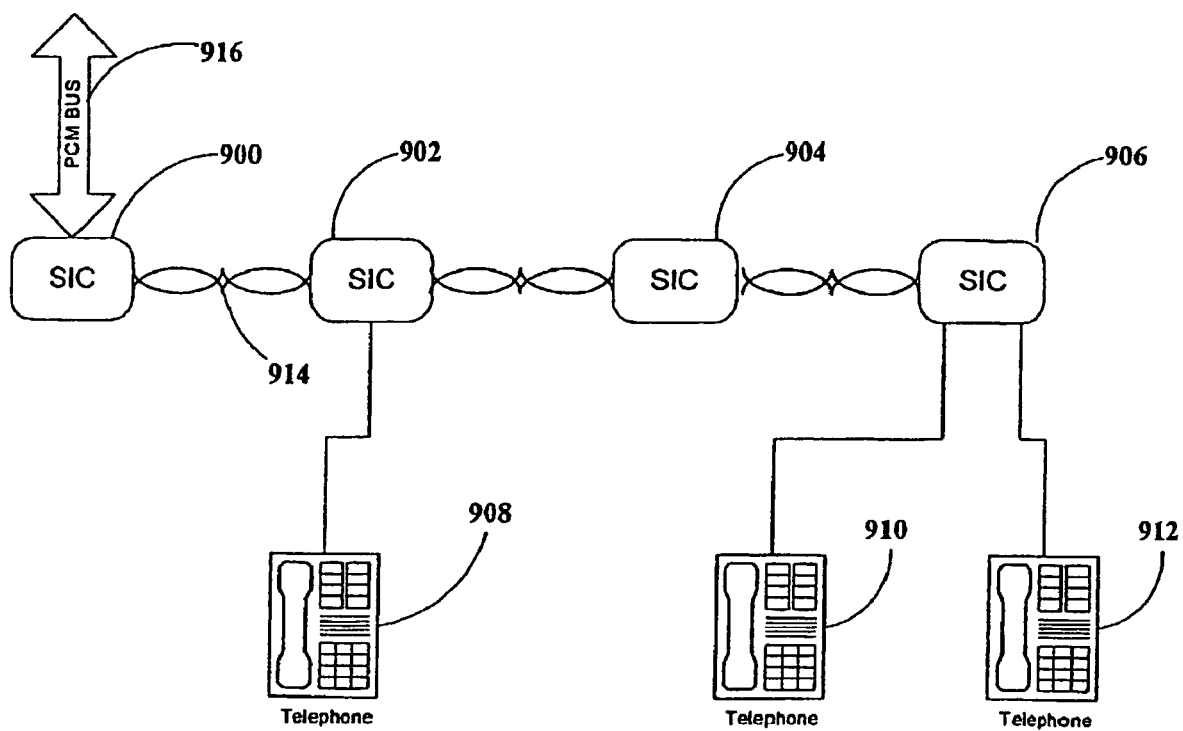
FIG. 9 shows a SIC-based multiplexer—PABX/PBX according to the present invention.

A network of SIC's may be used to implement a multiplexer or a PABX/PBX functionality, as illustrated in FIG. 9. In this example, a SIC 900 is connected to a high data rate connection, such as PCM bus 916, while SIC 902 and SIC 906 are connected to telephones 908, 910, and 912. SIC 904 functions as a repeater in this example.

In this example, the local area network functions as a multiplexer, wherein the bandwidth of the high data rate connection (PCM bus 916) is multiplexed through SIC 900 to SIC 902 and SIC 906, each of which may use a different portion of the bandwidth of the high data rate connection (PCM bus 916). Moreover, by the addition of telephones 908, 910, and 912, the local area network of FIG. 9 functions as a voice multiplexer.

Other Applications of the Invention

A number of applications of the present invention have been discussed above. Additional applications include, but are not limited to: intercom, PABX/PBX, security systems, video surveillance, entertainment broadcasting services, time (clock) distribution, and audio/video signal distribution. The networks implemented by the present invention can extend locally within a single building or over a neighborhood.

While the invention has been described with respect to a limited number of embodiments and applications, it will be appreciated that many variations, modifications and other applications of the invention may be made.

What is claimed is:

1. An outlet for coupling a data unit and an analog telephone set to in-wall wiring that simultaneously carries a bi-directional serial digital data signal multiplexed with a telephone signal, the outlet comprising:

a wiring connector operative for connecting said outlet to the in-wall wiring;

a data interface connector coupled to said wiring connector and connectable to the data unit, for coupling the serial digital data signal to the data unit;

a telephone connector coupled to said wiring connector and connectable to the analog telephone set, for coupling the telephone signal to the telephone set;

a data transceiver coupled between said data interface connector and said wiring connector for transmitting and receiving digital data with the data unit connected to said data interface connector; and a single enclosure housing said wiring connector, said data interface connector and said telephone connector, wherein said enclosure is dimensioned to be mountable into a standard outlet receptacle or opening, and wherein said outlet is further addressable in a network.

2. The outlet according to claim 1, wherein the in-wall wiring is one of: a twisted wire pair, a coaxial cable, a telephone wire-pair and powerline wiring, and said wiring connector is adapted to connect to the wiring.

3. The outlet according to claim 1, further comprising at least one active device, and wherein said outlet further comprises a power supply connected to said at least one active device for DC powering said at least one active device, said power supply having a connection point for connecting to a power source, and said outlet further comprises a visual indicator coupled to said power supply for indicating a status.

4. The outlet according to claim 3 further comprising a power connector connectable to the power source, and wherein said connection point is coupled to said power connector for supplying power to said outlet from the power source.

5. The outlet according to claim 3 wherein the in-wall wiring further simultaneously carries a power signal, and wherein said connection point is coupled to said wiring connector for supplying power to said outlet from the power signal.

6. The outlet according to claim 3 wherein said power supply comprises an AC/DC converter or a DC/DC converter.

7. The outlet according to claim 3 further comprising a power connector coupled to said connection point and connectable to a device for DC powering the device.

8. The outlet according to claim 1, wherein said outlet has a manually assigned address.

9. The outlet according to claim 1, wherein said outlet has an automatically assigned address.

10. The outlet according to claim 1, wherein said outlet has an address assigned by a data unit connected to the outlet.

11. The outlet according to claim 1, wherein at least one parameter of the outlet is configurable by a connected data unit.

12. The outlet according to claim 1, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

13. An outlet for coupling a data unit and an analog telephone set to in-wall wiring that simultaneously carries a bi-directional serial digital data signal multiplexed with a telephone signal, the outlet comprising:
a wiring connector operative for connecting said outlet to the in-wall wiring;
a data interface connector coupled to said wiring connector and connectable to the data unit, for coupling the serial digital data signal to the data unit;
a telephone connector coupled to said wiring connector and connectable to the analog telephone set, for coupling the telephone signal to the telephone set; and
a single enclosure housing said wiring connector, said data interface connector and said telephone connector, wherein said enclosure is dimensioned to be mountable into a standard outlet receptacle or opening, and wherein:
the telephone signal is an analog telephone signal, and the digital data signal and telephone signal are frequency multiplexed;
the digital data signal is carried in a frequency band distinct from, and higher than, the analog telephone signal, and
said outlet further comprises:
a high pass filter coupled between said wiring connector and said data interface connector for passing only the digital data signal; and
a low pass filter coupled between said wiring connector and said telephone connector for passing only the analog telephone signal.

14. The outlet according to claim 13, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

15. An outlet for coupling a data unit and an analog telephone set to in-wall wiring that simultaneously carries a bi-directional serial digital data signal multiplexed with a telephone signal, the outlet comprising:
a wiring connector operative for connecting said outlet to the in-wall wiring;
a data interface connector coupled to said wiring connector and connectable to the data unit, for coupling the serial digital data signal to the data unit;
a telephone connector coupled to said wiring connector and connectable to the analog telephone set, for coupling the telephone signal to the telephone set; and
a single enclosure housing said wiring connector, said data interface connector and said telephone connector, wherein said enclosure is dimensioned to be mountable into a standard outlet receptacle or opening, and wherein:
the telephone signal is a digitized telephone signal;
the digital data signal and digitized telephone signals are time multiplexed; and
said outlet further comprises:
a time multiplexer/demultiplexer coupled between said wiring connector, said data interface connector and said telephone connector, said time multiplexer/demultiplexer being operative to pass the telephone signal between said wiring connector and said telephone connector and to pass the digital data signal between said wiring connector and said data interface connector; and
a converter coupled between said telephone connector and said time multiplexer/demultiplexer for converting between the digitized telephone signal and the analog telephone signal.

16. The outlet according to claim 15, wherein the time multiplexed digital data signal and digitized telephone signal are carried using ISDN standard.

17. The outlet according to claim 10, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

18. An outlet for coupling a data unit and an analog telephone set to in-wall wiring that simultaneously carries a bi-directional serial digital data signal multiplexed with a telephone signal, the outlet comprising:
a wiring connector operative for connecting said outlet to the in-wall wiring;
a data interface connector coupled to said wiring connector and connectable to the data unit, for coupling the serial digital data signal to the data unit;
a telephone connector coupled to said wiring connector and connectable to the analog telephone set, for coupling the telephone signal to the telephone set; and
a single enclosure housing said wiring connector, said data interface connector and said telephone connector, wherein said enclosure is dimensioned to be mountable into a standard outlet receptacle or opening, further comprising a first transceiver coupled between said wiring connector and data interface connector, for conducting the serial digital data signal over the in-wall wiring.

19. The outlet according to claim 18, wherein said first transceiver is operative to bi-directionally communicate with one or more identical transceivers over the in-wall wiring.

20. The outlet according to claim 18, wherein said first transceiver is operative to bi-directionally communicate point-to-point with only a single mating transceiver over the in-wall wiring.

21. The outlet according to claim 18, further comprising a second transceiver coupled between said first transceiver and said standard data interface connector, said second transceiver being operative to effect full-duplex serial digital data communication with the data unit.

22. The outlet according to claim 18, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

23. An outlet for coupling a data unit and an analog telephone set to in-wall wiring that simultaneously carries a bi-directional serial digital data signal multiplexed with a telephone signal, the outlet comprising:
   a wiring connector operative for connecting said outlet to the in-wall wiring;
   a data interface connector coupled to said wiring connector and connectable to the data unit, for coupling the serial digital data signal to the data unit;
   a telephone connector coupled to said wiring connector and connectable to the analog telephone set, for coupling the telephone signal to the telephone set;
   a data transceiver coupled between said data interface connector and said wiring connector for transmitting and receiving digital data with the data unit connected to said data interface connector; and
   a single enclosure housing said wiring connector, said data interface connector and said telephone connector, wherein said enclosure is dimensioned to be mountable into a standard outlet receptacle or opening, and wherein the serial digital data signal coupled to the data unit conforms to an Ethernet standard.

24. The outlet according to claim 23, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

25. An outlet for coupling a data unit and an analog telephone set to in-wall wiring that simultaneously carries a bi-directional serial digital data signal multiplexed with a telephone signal, the outlet comprising:
   a wiring connector operative for connecting said outlet to the in-wall wiring;
   a data interface connector coupled to said wiring connector and connectable to the data unit, for coupling the serial digital data signal to the data unit;
   a telephone connector coupled to said wiring connector and connectable to the analog telephone set, for coupling the telephone signal to the telephone set; and
   a single enclosure housing said wiring connector, said data interface connector and said telephone connector, wherein said enclosure is dimensioned to be mountable into a standard outlet receptacle or opening, said outlet being further operative to provide a standard computer bus interface, said outlet further comprising a computer connector and mechanical means for connecting and attaching to a computer plug-in unit, said computer connector being coupled to said wiring connector.

26. The outlet according to claim 25, wherein said standard computer bus interface is one of: an ISA interface, a PCMCIA interface, an IDE interface, and a SCSI interface.

27. The outlet according to claim 25, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

28. An outlet for coupling a data unit and an analog telephone set to in-wall wiring that simultaneously carries a bi-directional serial digital data signal multiplexed with a telephone signal, the outlet comprising:
   a wiring connector operative for connecting said outlet to the in-wall wiring;
   a data interface connector coupled to said wiring connector and connectable to the data unit, for coupling the serial digital data signal to the data unit;
   a telephone connector coupled to said wiring connector and connectable to the analog telephone set, for coupling the telephone signal to the telephone set; and
   a single enclosure housing said wiring connector, said data interface connector and said telephone connector, wherein said enclosure is dimensioned to be mountable into a standard outlet receptacle or opening, said outlet further comprising firmware and a processor executing said firmware, and wherein the serial digital data is coupled to said processor via said wiring connector.

29. The outlet according to claim 28, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

30. An outlet for coupling to a data unit and to in-wall wiring, said outlet comprising:
   a wiring connector operative for connecting said outlet to the in-wall wiring;
   a first transceiver coupled to said wiring connector for conducting a full-duplex serial digital data communication over the in-wall wiring;
   a data interface connector connectable to the data unit;
   a second transceiver coupled to said data interface connector for conducting a bi-directional serial digital data communication with the data unit;
   firmware and a processor executing said firmware, said processor being coupled to said first and second transceivers; and
   a single enclosure housing said wiring connector, said processor, said firmware, said data interface connector, and said first and second transceivers, wherein said enclosure is dimensioned to be mountable into an outlet receptacle or opening.

31. The outlet according to claim 30, wherein the in-wall wiring is one of: a twisted-wire pair, a coaxial cable, a telephone wire-pair and powerline wiring, and said wiring connector is adapted to connect to the wiring.

32. The outlet according to claim 30, further comprising at least one active device, and wherein the outlet further comprises a power supply connected to said at least one active device for DC powering said at least one active device, said power supply having a connection point for connecting to a power source, and said outlet further comprises a visual indicator coupled to said power supply for indicating a status.

33. The outlet according to claim 32 further comprising a power connector connectable to the power source, and wherein said connection point is coupled to said power connector for supplying power to said outlet from the power source.

34. The outlet according to claim 32 wherein the in-wall wiring further simultaneously carries a power signal, and wherein said connection point is coupled to receive the power signal and to supply the power signal to said outlet for powering said outlet.

35. The outlet according to claim 32 wherein said power supply comprises an AC/DC converter or a DC/DC converter.

36. The outlet according to claim 32 further comprising a power connector coupled to said connection point and connectable to a device for DC powering the device.

37. The outlet according to claim 30, wherein said outlet is further addressable in a network.

38. The outlet according to claim 37, wherein said outlet has a manually assigned address.

39. The outlet according to claim 37, wherein said outlet has an automatically assigned address.

40. The outlet according to claim 37, wherein said outlet has an address assigned by a data unit connected to said outlet.

41. The outlet according to claim 30, wherein said first transceiver is operative to perform bi-directional communication with one or more identical transceivers over the in-wall wiring.

42. The outlet according to claim 30, wherein said first transceiver is operative to perform full-duplex point-to-point communication with only a single transceiver over the in-wall wiring.

43. The outlet according to claim 30, wherein said second transceiver is operative to perform bi-directional communication with one or more identical transceivers.

44. The outlet according to claim 30, wherein said second transceiver is operative to perform full-duplex point-to-point communication with only a single transceiver.

45. The outlet according to claim 30, wherein the communication with the data unit conforms to an Ethernet standard.

46. The outlet according to claim 30, wherein at least one parameter of the outlet is configurable by a connected data unit.

47. The outlet according to claim 30 further operative to provide a standard computer bus interface, said outlet further comprising a computer connector and mechanical means for connecting and attaching to a computer plug-in unit, said computer connector being coupled to said first transceiver.

48. The outlet according to claim 47, wherein said standard computer bus interface is one of: an ISA interface, a PCMCIA interface, an IDE interface, and a SCSI interface.

49. The outlet according to claim 30, further operative to couple an analog unit to said processor, said outlet further comprising an analog connector connectable to the analog unit for coupling an analog signal to said processor, and a converter for converting between analog and digital signals coupled between said analog connector and said processor.

50. The outlet according to claim 49, wherein the analog unit is an analog actuator for creating a physical phenomenon, and said converter is a digital to analog converter.

51. The outlet according to claim 49, wherein the analog unit is an analog sensor for sensing a physical phenomenon, and said converter is an analog to digital converter.

52. The outlet according to claim 49, wherein the analog unit is one of an audio unit and a video unit and the analog signal is one of an audio signal and a video signal, respectively.

53. The outlet according to claim 49, wherein the analog unit is a telephone unit, said analog connector is a telephone connector and the analog signal is a telephone signal.

54. The outlet according to claim 49, wherein said analog connector is coupled to said power supply and to the analog unit for DC powering the analog unit.

55. The outlet according to claim 30, wherein the in-wall wiring further carries a frequency multiplexed analog telephone signal or AC power signal.

56. The outlet according to claim 30, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

57. An active outlet for coupling to first and second data units, said outlet comprising:
   a first data interface connector connectable to the first data unit;
   a first transceiver coupled to said first data interface connector for conducting full-duplex serial digital data communication with the first data unit;
   a second data interface connector connectable to the second data unit;
   a second transceiver coupled to said second data interface connector for conducting full-duplex serial digital data communication with the second data unit; and
   a single enclosure housing said first and second data interfaces, and said first and second transceivers;
   wherein said enclosure is dimensioned to be mountable into a standard outlet receptacle or opening.

58. The outlet according to claim 57, wherein the communication with the first data unit is independent of the communication with the second data unit.

59. The outlet according to claim 57, further comprising at least one active device, and wherein said outlet further comprises a power supply connected to said at least one active device for DC powering said at least one active device, said power supply having a connection point for connecting to a power source, and said outlet further comprises a visual indicator coupled to said power supply for indicating a status.

60. The outlet according to claim 59, further comprising a power connector connectable to the power source, and wherein said connection point is coupled to said power connector for supplying power to said outlet from the power source.

61. The outlet according to claim 59 wherein said power supply comprises a DC/DC converter.

62. The outlet according to claim 59 further comprising a power connector coupled to said connection point and connectable to a device for DC powering the device.

63. The outlet according to claim 57, wherein said outlet is further addressable in a network.

64. The outlet according to claim 63, wherein said outlet has a manually assigned address.

65. The outlet according to claim 63, wherein said outlet has an automatically assigned address.

66. The outlet according to claim 63 wherein said outlet has an address assigned by a data unit connected to said outlet.

67. The outlet according to claim 57, wherein said first transceiver is operative to perform bi-directional communication with one or more identical transceivers.

68. The outlet according to claim 57, wherein said first transceiver is operative to perform full-duplex point-to-point communication with only a single mating transceiver.

69. The outlet according to claim 57, wherein said second transceiver is operative to perform bi-directional communication with one or more identical transceivers.

70. The outlet according to claim 57, wherein said second transceiver is operative to perform full-duplex point-to-point communication with only a single mating transceiver.

71. The outlet according to claim 57, wherein the communication with each of said first and second data units conforms to an Ethernet protocol.

72. The outlet according to claim 57, wherein at least one parameter of the outlet is configurable by a connected data unit.

73. The outlet according to claim 57 further operative to provide a standard computer bus interface, said outlet further comprising a computer connector and mechanical means for connecting and attaching to a computer plug-in unit, said computer connector being coupled to said first transceiver.

74. The outlet according to claim 73, wherein said standard computer bus interface is one of: an ISA interface, a PCMCIA interface, an IDE interface, and a SCSI interface.

75. The outlet according to claim 57, further operative to couple an analog unit to the first data unit, said outlet further comprising an analog connector connectable to the analog unit for coupling an analog signal to the first data unit, and a converter between the analog and digital signals coupled between said analog connector and said first transceiver.

76. The outlet according to claim 75, wherein the analog unit is an analog actuator for creating a physical phenomenon, and said converter is a digital to analog converter.

77. The outlet according to claim 75, wherein the analog unit is an analog sensor for sensing a physical phenomenon, and said converter is an analog to digital converter.

78. The outlet according to claim 75, wherein the analog unit is one of an audio unit and a video unit and the analog signal is one of an audio signal and a video signal, respectively.

79. The outlet according to claim 75, wherein the analog unit is a telephone unit, said analog connector is a telephone connector and the analog signal is a telephone signal.

80. The outlet according to claim 75, further comprising a DC power supply coupled to said analog connector, and wherein said analog connector is coupled to said power supply and to the analog unit for DC powering the analog unit.

81. The outlet according to claim 57, further operative to transparently pass data from the first data unit to the second data unit and wherein said first transceiver is coupled to said second transceiver.

82. The outlet according to claim 57, wherein the in-wall wiring further carries a frequency multiplexed analog telephone signal or AC power signal.

83. The outlet according to claim 57, wherein said single enclosure is constructed to have at least one of the following:
 a form substantially similar to that of a standard outlet;
 wall mounting elements substantially similar to those of a standard wall outlet;
 a shape allowing direct mounting in an outlet opening or cavity; and
 a form to at least in part substitute for a standard outlet.

84. An outlet for coupling an analog device to an in-wall wiring carrying serial digital data, the outlet comprising:
 a wiring connector operative for connecting said outlet to the in-wall wiring;
 a transceiver coupled to said wiring connector for conducting serial digital data communication over the in-wall wiring;
 an analog connector connectable to the analog device for coupling the serial digital data to the analog device;
 a converter for converting between analog and digital signals coupled between said analog connector and said transceiver; and
 a single enclosure housing said transceiver, and said wiring and analog connectors,
wherein said enclosure is dimensioned to be mountable into a standard outlet receptacle or opening.

85. The outlet according to claim 84, wherein said in-wall wiring is one of: a twisted-wire pair, a coaxial cable, a telephone wire-pair and powerline wiring, and said transceiver is adapted to conduct the serial digital data over the wiring.

86. The outlet according to claim 84, wherein the analog device is an analog actuator for creating a physical phenomenon, and said converter is a digital to analog converter.

87. The outlet according to claim 84, wherein the analog device is an analog sensor for sensing a physical phenomenon, and said converter is an analog to digital converter.

88. The outlet according to claim 84, wherein the analog device is one of an audio unit and a video unit and the analog signal is one of an audio signal and a video signal, respectively.

89. The outlet according to claim 84, wherein the analog device is a telephone unit, the analog connector is a telephone connector and the analog signal is a telephone signal.

90. The outlet according to claim 84, wherein said transceiver is operative to perform full-duplex communication.

91. The outlet according to claim 84, further comprising a power supply connected to said transceiver for DC powering said transceiver, said power supply having a connection point for connecting to a power source, and wherein said outlet further comprises a visual indicator coupled to said power supply for indicating a status.

92. The outlet according to claim 91 further comprising a power connector connectable to a power source, and wherein said connection point is coupled to said power connector for supplying power to said outlet from the power source.

93. The outlet according to claim 91 wherein the in-wall wiring further simultaneously carries a power signal, and wherein said connection point is coupled to the wiring for supplying power to said outlet from the power signal.

94. The outlet according to claim 91 wherein said power supply comprises an AC/DC converter, or a DC/DC converter.

95. The outlet according to claim 84, wherein said outlet is further addressable in a network.

96. The outlet according to claim 95, wherein said outlet has a manually assigned address.

97. The outlet according to claim 95, wherein said outlet has an automatically assigned address.

98. The outlet according to claim 95, wherein said outlet has an address assigned by a data unit connected to said outlet.

99. The outlet according to claim 84, wherein said transceiver is operative to bi-directionally communicate with one or more identical transceivers over the in-wall wiring.

100. The outlet according to claim 84, wherein said transceiver is operative to bi-directionally point-to-point communicate with only a single mating transceiver over the in-wall wiring.

101. The outlet according to claim 84, wherein at least one parameter of the outlet is configurable by a connected data unit.

102. The outlet according to claim 84 further operative to provide a standard computer bus interface, said outlet further comprising a computer connector and mechanical means for connecting and attaching to a computer plug-in unit, said computer connector being coupled to said wiring connector.

103. The outlet according to claim 102 wherein said standard computer bus interface is one of: an ISA interface, a PCMCIA interface, an IDE interface, and a SCSI interface.

104. The outlet according to claim 84 further comprising firmware and a processor executing said firmware, and wherein the serial digital data is coupled to said processor via said wiring connector.

105. The outlet according to claim 84, wherein the in-wall wiring further carries a frequency multiplexed analog telephone signal or AC power signal.

106. The outlet according to claim 84, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

107. An outlet for coupling to an in-wall wiring carrying serial digital data, said outlet comprising:
a wiring connector operative for connecting the outlet to said in-wall wiring;
a first transceiver coupled to said wiring connector for conducting serial digital data communication over the in-wall wiring; and
a single enclosure housing said wiring connector and said first transceiver,
wherein said enclosure is dimensioned to be mountable into a standard outlet receptacle or opening, and
wherein said outlet is further operative to couple serial digital data to a data unit, and said outlet further comprises:
a data interface connector connectable to the data unit; and
a second transceiver coupled between said first transceiver and said data interface connector for conducting bi-directional digital data communication with the data unit.

108. The outlet according to claim 107, wherein the in-wall wiring is one of: a twisted-wire pair, a coaxial cable, a telephone wire-pair and powerline wiring, and said first transceiver is adapted to conduct the serial digital data over the wiring.

109. The outlet according to claim 107, operative for coupling the serial digital data to an analog unit, said outlet further comprising:
an analog connector connectable to the analog unit for coupling the serial digital data to the analog unit; and
a converter for converting between analog and digital signals coupled between said analog connector and said first transceiver.

110. The outlet according to claim 109, wherein the analog unit is an analog actuator for creating a physical phenomenon, and said converter is a digital to analog converter.

111. The outlet according to claim 109, wherein the analog unit is an analog sensor for sensing a physical phenomenon, and said converter is an analog to digital converter.

112. The outlet according to claim 109, wherein the analog unit is one of an audio unit and a video unit and the analog signal is one of an audio signal and a video signal, respectively.

113. The outlet according to claim 109, wherein the analog unit is a telephone unit, the analog connector is a telephone connector and the analog signal is a telephone signal.

114. The outlet according to claim 107, wherein said first transceiver is operative to perform full-duplex communication.

115. The outlet according to claim 107, further comprising a power supply connected to said first transceiver for DC powering said first transceiver, said power supply having a connection point for connecting to a power source, and wherein said outlet further comprises a visual indicator coupled to said power supply for indicating a status.

116. The outlet according to claim 115 further comprising a power connector connectable to a power source, and wherein said connection point is coupled to said power connector for supplying power to said outlet from the power source.

117. The outlet according to claim 115 wherein the in-wall wiring further simultaneously carries a power signal, and wherein said connection point is coupled to the wiring for supplying power to said outlet from the power signal.

118. The outlet according to claim 115 wherein said power supply comprises an AC/DC converter or a DC/DC converter.

119. The outlet according to claim 104, wherein said outlet is further addressable in a network.

120. The outlet according to claim 119, wherein said outlet has a manually assigned address.

121. The outlet according to claim 119, wherein said outlet has an automatically assigned address.

122. The outlet according to claim 119, wherein said outlet has an address assigned by a data unit connected to said outlet.

123. The outlet according to claim 104, wherein said first transceiver is operative to perform bi-directional communication with one or more identical transceivers over the in-wall wiring.

124. The outlet according to claim 104, wherein said first transceiver is operative to perform bi-directional point-to-point communication with only a single mating transceiver over the in-wall wiring.

125. The outlet according to claim 104, wherein at least one parameter of the outlet is configurable by a connected data unit.

126. The outlet according to claim 107 further operative to provide a standard computer bus interface, said outlet further comprising a computer connector and mechanical means for connecting and attaching to a computer plug-in unit, said computer connector being coupled to said wiring connector.

127. The outlet according to claim 126, wherein said standard computer bus interface is one of: an ISA interface, a PCMCIA interface, an IDE interface, and a SCSI interface.

128. The outlet according to claim 107 further comprising firmware and a processor for executing said firmware and wherein the serial digital data is coupled to said processor via said wiring connector.

129. The outlet according to claim 107, wherein the in-wall wiring further carries a frequency multiplexed analog telephone signal or AC power signal.

130. The outlet according to claim 107, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

131. An outlet for coupling an analog telephone set to in-wall wiring carrying digitized telephone data, said outlet comprising:
a wiring connector operative for connecting said outlet to the in-wall wiring;
a transceiver coupled to said wiring connector for conducting communication of the digitized telephone data over the in-wall wiring;
a telephone connector connectable to an analog telephone set for coupling the analog telephone set to the digitized telephone data;
a converter for converting between analog and digitized telephone signals coupled between said telephone connector and said transceiver; and
a single enclosure housing said transceiver, said converter and said wiring and telephone connectors,
wherein said enclosure is dimensioned to be mountable into a standard outlet receptacle or opening.

132. The outlet according to claim 131, wherein the in-wall wiring is one of: a twisted-wire pair, a coaxial cable, a telephone wire-pair and powerline wiring, and said transceiver is adapted to conduct the serial digital data over the wiring.

133. The outlet according to claim 131, wherein said transceiver is operative to effect full-duplex communication.

134. The outlet according to claim 131, further comprising a power supply connected to said transceiver for DC powering said transceiver, said power supply having a connection point for connecting to a power source, and wherein said outlet further comprises a visual indicator coupled to said power supply for indicating a status.

135. The outlet according to claim 134 further comprising a power connector connectable to a power source, and wherein said connection point is coupled to said power connector for supplying power to said outlet from the power source.

136. The outlet according to claim 134 wherein the in-wall wiring further simultaneously carries a power signal, and wherein said connection point is coupled for supplying power to said outlet from the power signal.

137. The outlet according to claim 134 wherein said power supply comprises an AC/DC converter or a DC/DC converter.

138. The outlet according to claim 134 further comprising a power connector coupled to said connection point and connectable to a device for DC powering the device.

139. The outlet according to claim 131, wherein said outlet is further addressable in a network.

140. The outlet according to claim 139, wherein said outlet has a manually assigned address.

141. The outlet according to claim 139, wherein said outlet has an automatically assigned address.

142. The outlet according to claim 139, wherein said outlet has an address assigned by a data unit connected to said outlet.

143. The outlet according to claim 131, wherein said transceiver is operative to perform bi-directional communication with one or more identical transceivers over the in-wall wiring.

144. The outlet according to claim 131, wherein said transceiver is operative to perform bi-directional point-to-point communication with only a single mating transceiver over the in-wall wiring.

145. The outlet according to claim 131, wherein at least one parameter of said outlet is configurable by a connected data unit.

146. The outlet according to claim 131 further operative to provide a standard computer bus interface, said outlet further comprising a computer connector and mechanical means for connecting and attaching to a computer plug-in unit, said computer connector being coupled to said wiring connector.

147. The outlet according to claim 146, wherein said standard computer bus interface is one of: an ISA interface, a PCMCIA interface, an IDE interface, and a SCSI interface.

148. The outlet according to claim 131 further comprising firmware and a processor executing said firmware, and wherein the serial digital data is coupled to said processor via said wiring connector.

149. The outlet according to claim 131, wherein the in-wall wiring further carries a frequency multiplexed analog telephone signal or AC power signal.

150. The outlet according to claim 131, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

151. An outlet for parallel coupling to in-wall wiring carrying bi-directional serial digital data, said outlet comprising:
a wiring connector operative for connecting said outlet to the in-wall wiring;
a transceiver coupled to said wiring connector for conducting serial digital datacommunication over the in-wall wiring;
a parallel port coupled to said transceiver for parallel coupling to the serial digital data; and
a single enclosure housing said transceiver, said parallel port and said wiring connector,
wherein said enclosure is dimensioned to be mountable into a standard outlet receptacle or opening.

152. The outlet according to claim 151, wherein the in-wall wiring type is one of: a twisted-wire pair, a coaxial cable, a telephone wire-pair and powerline wiring, and said transceiver is adapted to conduct the serial digital data over the wiring.

153. The outlet according to claim 151 further wherein said parallel port is part of a standard computer bus interface, and said outlet further comprises a computer connector and mechanical means for connecting and attaching to a computer plug-in unit, said computer connector being coupled to said parallel port.

154. The outlet according to claim 153, wherein said standard computer bus interface is one of an ISA interface and a PCMCIA interface.

155. The outlet according to claim 151 further comprising a data connector coupled to the said parallel port, for parallel bi-directional communication with a data unit.

156. The outlet according to claim 155, wherein the parallel communication is based on an ITU-T V.35 standard.

157. The outlet according to claim 151, wherein said transceiver is operative to perform full-duplex communication.

158. The outlet according to claim 151, further comprising a power supply connected to said transceiver for DC powering said transceiver, said power supply having a connection point for connecting to a power source, and wherein said outlet further comprises a visual indicator coupled to said power supply for indicating a status.

159. The outlet according to claim 158 further comprising a power connector connectable to the power source, and wherein said connection point is coupled to said power connector for supplying power to said outlet from the power source.

160. The outlet according to claim 158 wherein the in-wall wiring further simultaneously carries a power signal, and wherein said connection point is coupled to the power signal for supplying power to said outlet from the power signal.

161. The outlet according to claim 158 wherein said power supply comprises an AC/DC converter a DC/DC converter.

162. The outlet according to claim 158 further comprising a power connector coupled to said connection point and connectable to a device for DC powering the device.

163. The outlet according to claim 158, further comprising a visual indicator connected to receive operating power from said connection point for indicating a communication status.

164. The outlet according to claim 151, wherein said outlet is further addressable in a network.

165. The outlet according to claim 164, wherein said outlet has a manually assigned address.

166. The outlet according to claim 164, wherein said outlet has an automatically assigned address.

167. The outlet according to claim 164, wherein said outlet has an address assigned by a data unit connected to said outlet.

168. The outlet according to claim 151, wherein said transceiver is operative to perform bi-directional communication with one or more identical transceivers over the in-wall wiring.

169. The outlet according to claim 151, wherein said transceiver is operative to perform bi-directional point-to-point communication with only a single mating transceiver over the in-wall wiring.

170. The outlet according to claim 151, wherein at least one parameter of said outlet is configurable by a connected data unit.

171. The outlet according to claim 151 further comprising firmware and a processor executing said firmware, and wherein said processor is coupled to control said transceiver.

172. The outlet according to claim 151, wherein the in-wall wiring further carries a frequency multiplexed analog telephone signal or AC power signal.

173. The outlet according to claim 151, wherein said single enclosure is constructed to have at least one of the following:
    a form substantially similar to that of a standard outlet;
    wall mounting elements substantially similar to those of a standard wall outlet;
    a shape allowing direct mounting in an outlet opening or cavity; and
    a form to at least in part substitute for a standard outlet.

174. An active outlet for coupling distinct first and second data conveying transmission lines, said outlet comprising:
    a first port couplable to the first digital data conveying transmission line, the first transmission line being at least in part in wall of a building;
    a first transceiver coupled to said first port for bi-directional serial digital data communication with an identical transceiver over the first digital data conveying transmission line;
    a second port couplable to the second digital data conveying transmission line, the second digital data conveying transmission line being of a type distinct from the first digital data conveying transmission line;
    a second transceiver coupled to said second port for bi-directional serial digital data communication with an identical transceiver over the second digital data conveying transmission line, said second transceiver being of a type distinct from said first transceiver; and
    a single enclosure housing said first and second ports and said first and second transceivers,
wherein said first and second transceivers are coupled to each other for passing data between said first and second ports, and said enclosure is dimensioned to be mountable into a standard outlet receptacle or opening.

175. The outlet according to claim 174, wherein the first in-wall digital data conveying transmission line comprises at least two conductors, said first port consists of a connector, and said first transceiver is operative for conducting signals over the at least two conductors.

176. The outlet according to claim 175, wherein the first transmission line is one of: a twisted wire pair; a coaxial cable; a telephone wire pair; and powerline wiring, and said first transceiver is adapted to conduct serial digital data over the first in-wall transmission line.

177. The outlet according to claim 174, wherein the first transmission line further carries a frequency multiplexed analog telephone signal or AC power signal.

178. The outlet according to claim 174, wherein the second digital data conveying transmission line comprises at least two conductors, said second port consists of a connector, and said second transceiver is operative for conducting signals over the at least two conductors.

179. The outlet according to claim 178, wherein the second digital data conveying transmission line in one of: a twisted wire pair; a coaxial cable; a telephone wire pair; and powerline wiring, and said second transceiver is adapted to conduct serial digital data over the second digital data conveying transmission line.

180. The outlet according to claim 174, further comprising at least one active device, and wherein the outlet further comprises a power supply connected to said at least one active device for DC powering said at least one active device, said power supply having a connection point for connecting to a power source, and said outlet further comprises a visual indicator coupled to said power supply for indicating a status.

181. The outlet according to claim 180 further comprising a power connector connectable to a power source, and wherein said connection point is coupled to said power connector for powering the power supply from the power source.

182. The outlet according to claim 180 wherein said power supply comprises a DC/DC converter.

183. The outlet according to claim 174, wherein said outlet is further addressable in a network.

184. The outlet according to claim 183, wherein the outlet address is manually assigned.

185. The outlet according to claim 183, wherein the outlet address is automatically assigned.

186. The outlet according to claim 183, wherein the outlet address is assigned by a data unit connected to the outlet.

187. The outlet according to claim 174, wherein said first transceiver is operative to perform full-duplex communication with one or more identical transceivers.

188. The outlet according to claim 174, wherein said first transceiver is operative to perform full-duplex point-to-point communication with only a single mating transceiver over the first transmission line.

189. The outlet according to claim 174, wherein said second transceiver is operative to perform full-duplex communication with one or more identical transceivers.

190. The outlet according to claim 174, wherein said second transceiver is operative to perform full-duplex point-to-point communication with only a single mating transceiver over the second transmission line.

191. The outlet according to claim 174, wherein communication with one of said first and second ports and one of said first and second transceivers, respectively, conforms to an Ethernet protocol.

192. The outlet according to claim 174, wherein at least one parameter of the outlet is configurable by a connected data unit.

193. The outlet according to claim 174, wherein the protocol of signals on the first transmission line is distinct from the protocol of signals on the second transmission line, and said outlet is further operative to convert between the distinct protocols.

194. The outlet according to claim 174 further comprising firmware and a processor executing said firmware, said processor being coupled to said first and second transceivers for controlling their operation.

195. The outlet according to claim 174, wherein said single enclosure is constructed to have at least one of the following:

a form substantially similar to that of a standard outlet;

wall mounting elements substantially similar to those of a standard wall outlet;

a shape allowing direct mounting in an outlet opening or cavity; and a form to at least in part substitute for a standard outlet.

* * * * *

UNITED STATES PATENT AND TRADEMARK OFFICE
CERTIFICATE OF CORRECTION

PATENT NO. : 7,221,679 B2  Page 1 of 1
APPLICATION NO. : 11/234302
DATED : May 22, 2007
INVENTOR(S) : Yehuda Binder It is certified that error appears in the above-identified patent and that said Letters Patent is hereby corrected as shown below:

Column 14, line 46, delete "10" and insert therefor --15--;
Column 22, line 50, delete "104" and insert therefor --107--;
Column 22, line 60, delete "104" and insert therefor --107--;
Column 22, line 64, delete "104" and insert therefor --107--;
Column 23, line 1, delete "104" and insert therefor --107--.

Signed and Sealed this

Tenth Day of June, 2008

JON W. DUDAS
*Director of the United States Patent and Trademark Office*